United States Patent [19]

McCoy et al.

[11] Patent Number: 5,117,399
[45] Date of Patent: May 26, 1992

[54] DATA PROCESSING AND DISPLAY FOR ECHO SOUNDING DATA

[75] Inventors: James N. McCoy, 2210 Midwestern Pkwy., Wichita Falls, Tex. 76308; Kenneth L. Huddleston, Wichita Falls; Augusto L. Podio, Austin, both of Tex.

[73] Assignee: James N. McCoy, Wichita Falls, Tex.

[21] Appl. No.: 552,465

[22] Filed: Jul. 16, 1990

[51] Int. Cl.⁵ .................... G01S 15/00; G01U 1/00
[52] U.S. Cl. .................... 367/99; 367/107; 367/33
[58] Field of Search ............ 367/99, 107, 111, 113, 367/908, 33; 181/123; 340/621, 290 V; 73/151; 364/561, 569

[56] References Cited

U.S. PATENT DOCUMENTS

| | | | |
|---|---|---|---|
| 2,190,141 | 2/1940 | Walker | 367/25 |
| 2,232,476 | 2/1941 | Ritzmann | 367/908 |
| 3,316,997 | 5/1967 | McCoy | 367/908 |
| 3,915,256 | 10/1975 | McCoy | 181/124 |
| 4,318,298 | 3/1982 | Godbey et al. | 367/908 |
| 4,408,676 | 10/1983 | McCoy | 367/908 |
| 4,637,463 | 1/1987 | McCoy | 367/908 |
| 4,793,178 | 12/1988 | Ahern et al. | 73/290 V |
| 4,934,186 | 6/1990 | McCoy | 367/908 |

OTHER PUBLICATIONS

Automatic Echometer Operating Manual (Dated Apr. 10, 1989).

*Primary Examiner*—Daniel T. Pihulic
*Attorney, Agent, or Firm*—Richards, Medlock & Andrews

[57] ABSTRACT

An echo sounding system includes a acoustic gun which is mounted to the wellhead of a borehole. The acoustic gun produces a acoustic pulse which is transmitted down the borehole. A tubing string is installed in the borehole and it has substantially evenly spaced collars. Fluid is pumped from the borehole, or well, by use of a reciprocating pump driven by a pump rod extending to the surface. Fluid is received from a surrounding formation and collects in the borehole. The acoustic pulse produces reflections when it strikes the tubing collars and the surface of the fluid. A microphone detects the reflections to produce a return signal. This signal is digitized and stored. The digitized signal is processed to detect the rate of the collar reflections and the stored signal is narrowband filtered with a passband filter centered at the rate of receipt of the collars. The data signal is further processed to determine the time of occurrence of the acoustic pulse and the liquid surface reflection. Each cycle of the narrowband filtered signal corresponds to one collar reflection. In this signal, each cycle is counted, and extrapolation used when necessary to produce a collar count extending from the surface to the liquid surface. This is multiplied by the average joint length to produce the depth to the liquid surface. The data signal and various well parameters and a schematic of the well are displayed for use by an operator. The system further detects the liquid level and displays it as a marker on the data signal. An operator can use the automatically determined marker or move it to another position. Finally, the operator is provided with optimum operating parameters for achieving maximum production from the well.

27 Claims, 22 Drawing Sheets

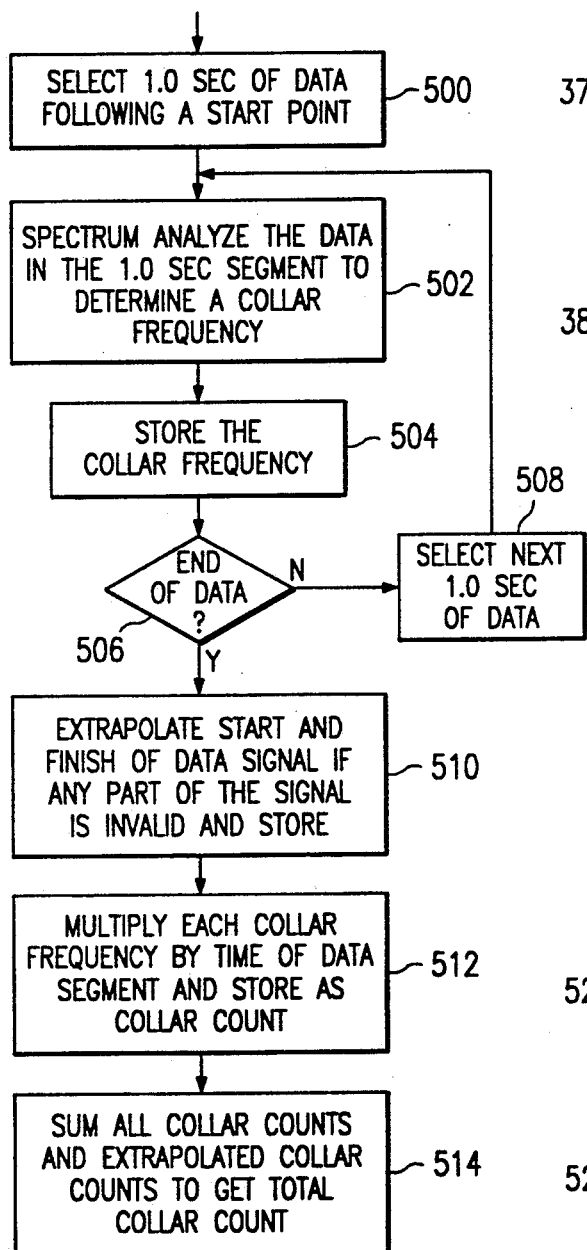
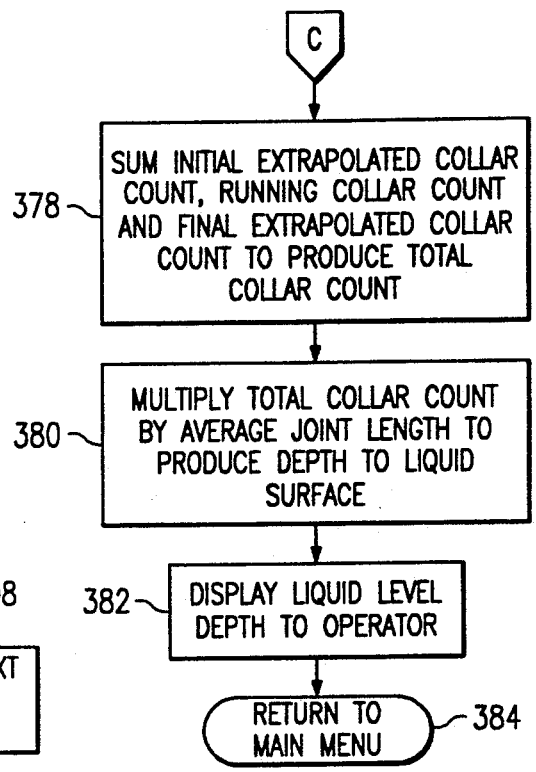
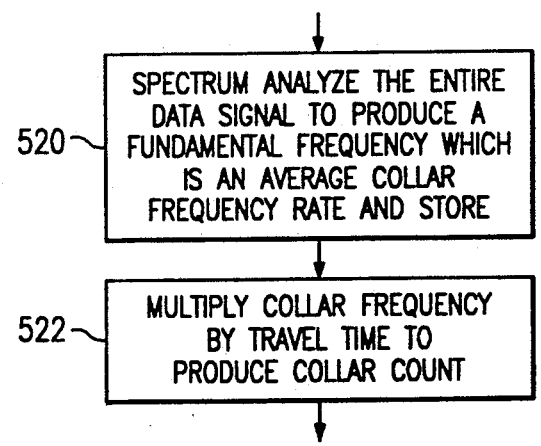
FIG. 9
FIG. 13A
FIG. 13B

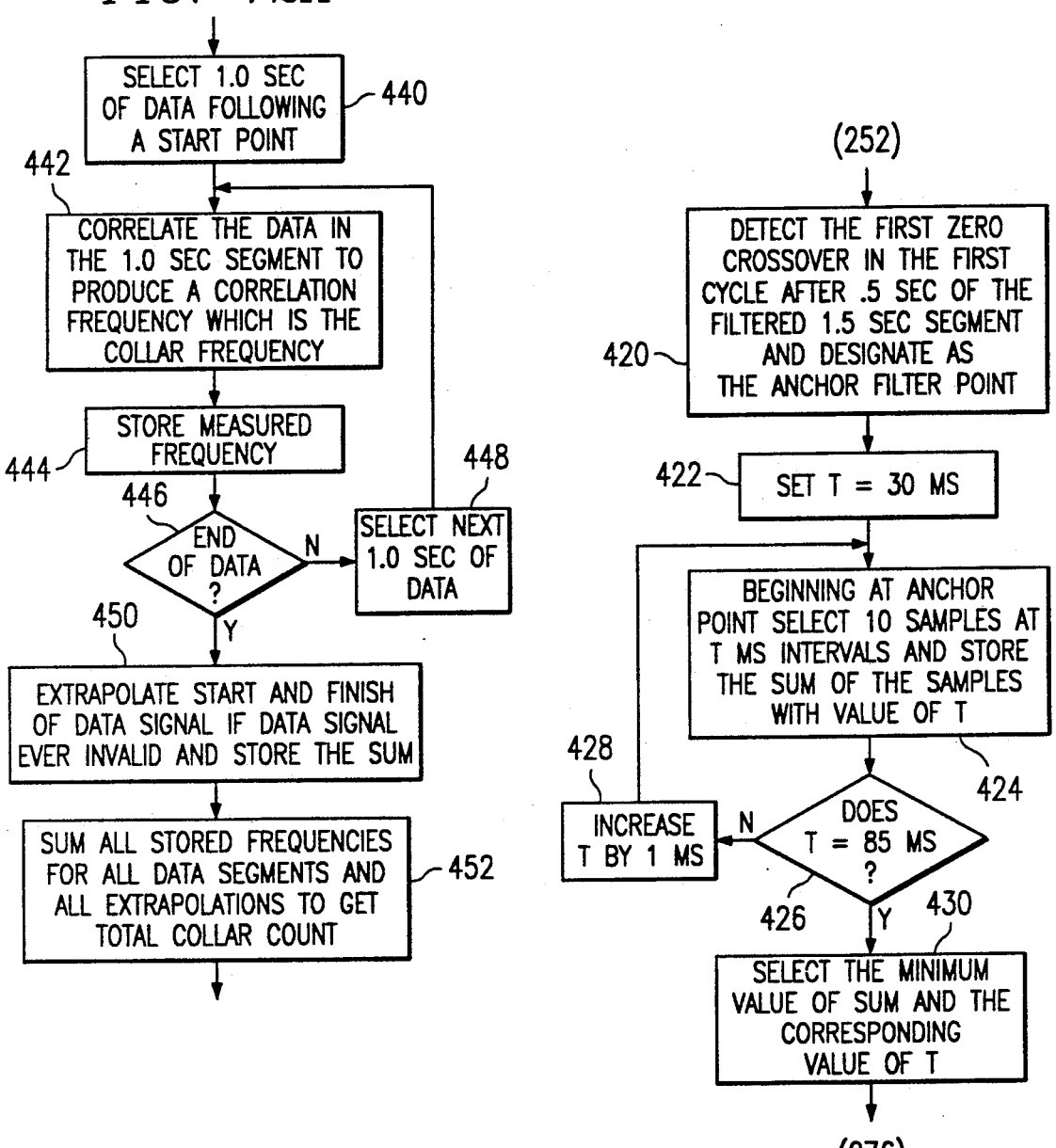
FIG. 12A
FIG. 11
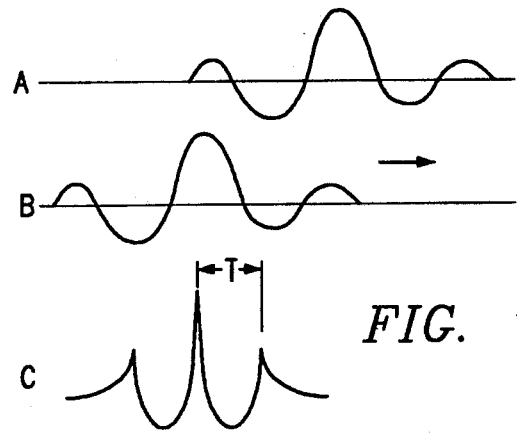
FIG. 12B

```
WELL: BROWN_1_        COMPANY: OXY USA    NAME: JACK SMITH
SBHP= 1296 psia       METHOD: ACOUSTIC    HUT-IN DAYS: 3    DATE: 4/6/90
PRESSURE DATUM: 6312 ft    TUBING ANCHOR-    FT    PUMP INTAKE: 6312 ft
FLUID GRAVITIES:
GAS GRAVITY 0.71 SG      GAS NON-HYDROCARBONS- CO2=0%  N2= 0%  H2S= 0%
WATER GRAVITY 1.05 SG    OIL GRAVITY 43 API
AVERAGE JOINT LENGTH- 31.7 FT/JT    CASING, OD- 5.5 IN    TUBING, OD- 2.375 IN
CURRENT PRODUCTION: BOPD- 10    BWPD- 4    MCF/D- 45
SURFACE CASING PRESSURE= 56.0 psig
CASING PRESSURE BUILDUP= 10 psi    INCREASE IN 10 MINUTES OF SHUTIN
SURFACE TEMPERATURE(F) 76          BOTTOMHOLE TEMPERATURE(F)  123
```

208

F1-ACQUIRE ACOUSTIC DATA
F2-SAVE CURRENT DATA AND CLEAR FORM
F3-RECALL DIFFERENT WELL DATA
F4-RECALL ACOUSTIC DATA
ESC-RETURN TO THE TITLE SCREEN

FIG. 14

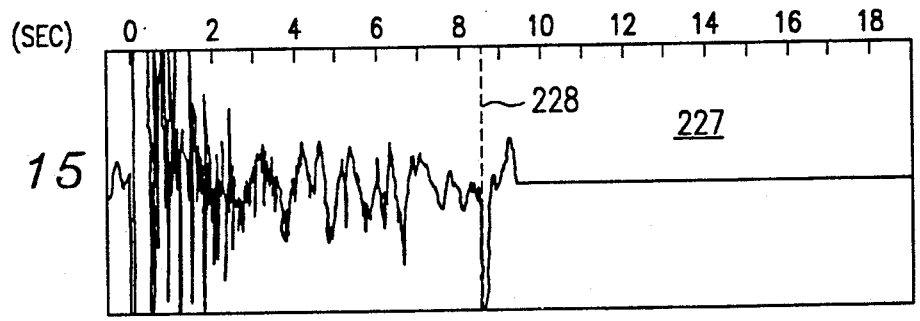

FIG. 15

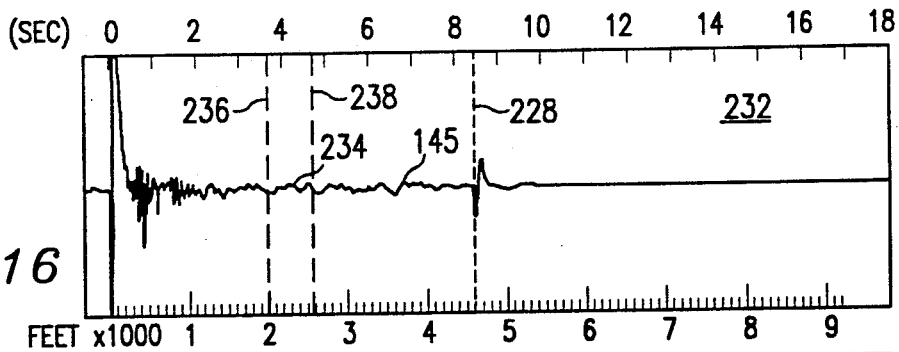

FIG. 16

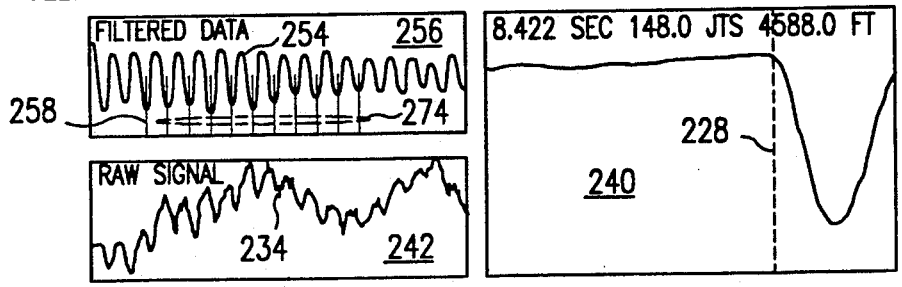

(FEET x 1000)

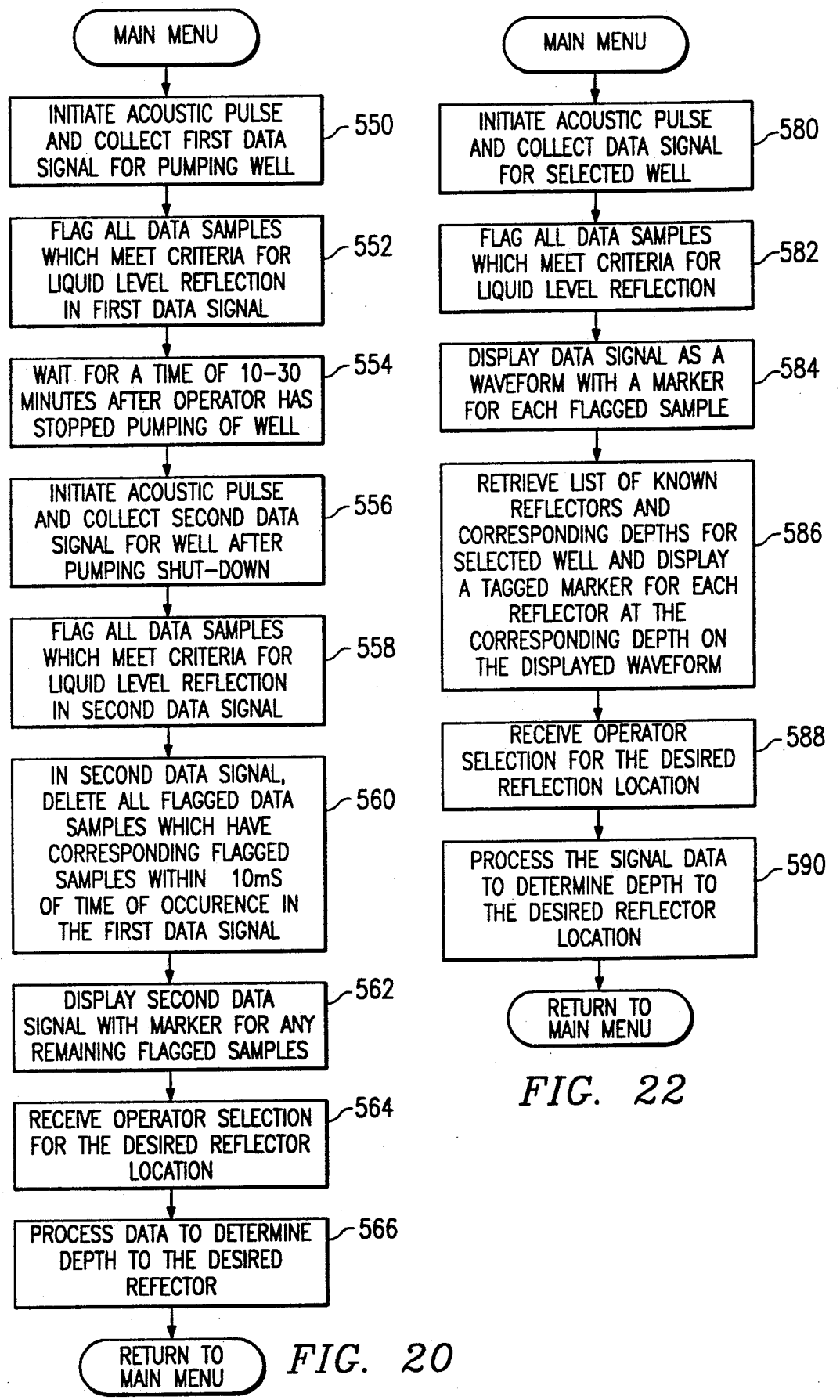

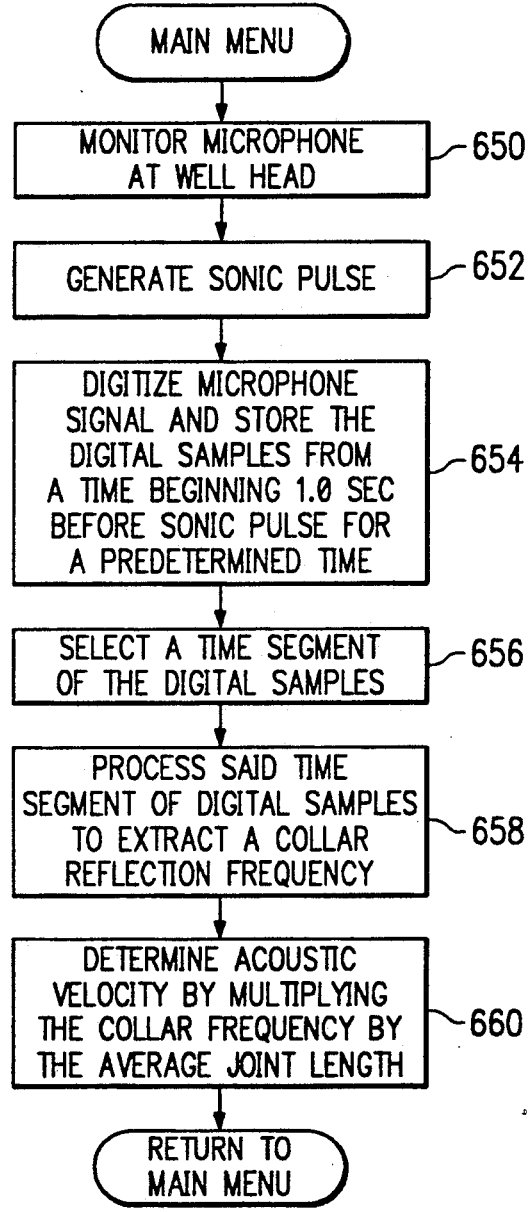

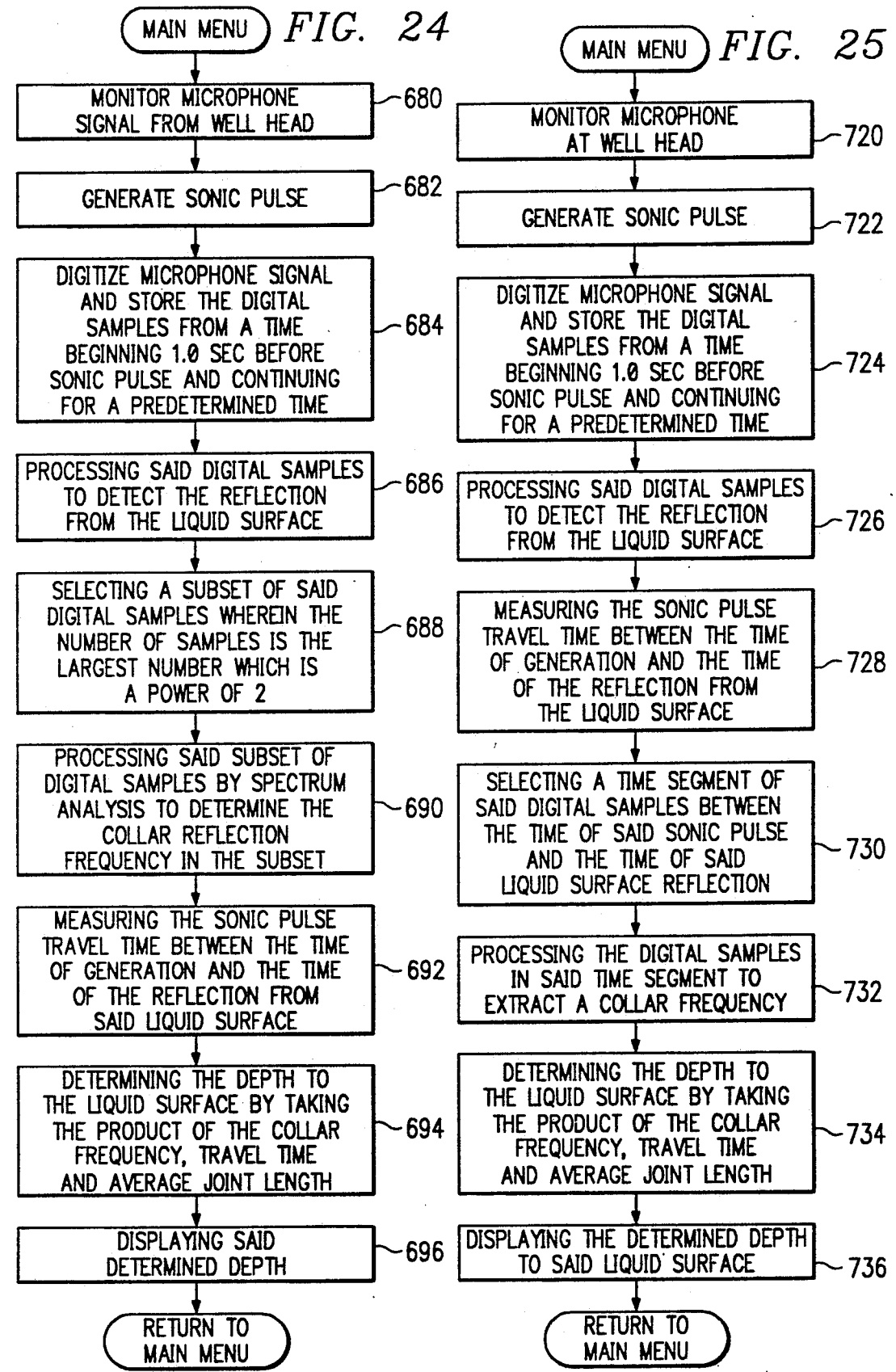

DATA PROCESSING AND DISPLAY FOR ECHO SOUNDING DATA

FIELD OF THE INVENTION

The present invention pertains in general to the measurement of depths for boreholes in the earth by the use of sonic reflections and in particular to making such measurements using specific signal processing, filtering and display techniques.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

In the majority of oil wells, the fluid is produced by a lift pump which delivers the fluid from the formation to the surface through a tubing string. Generally, the pump is of the reciprocating type which is driven by a rod extending through the tubing. However, electric pumps may also be used. As fluid is removed from the wellbore, fluid flows from the surrounding formation into the wellbore due to the higher pressure in the formation. The wellbore pressure at the formation is the summation of the casing pressure, the gas column pressure and the liquid column pressure above the formation. If the pump does not have sufficient capacity to remove all of the liquid from the wellbore, a column of liquid or a high casing pressure will result. This causes an increase in the wellbore pressure and thus restricts the flow of fluid from the formation into the wellbore. Under these conditions, the maximum fluid flow into the wellbore does not occur. In most cases, an operator desires to obtain the maximum production from a well and hence he desires to maintain the liquid level near the formation with a minimum of casing pressure. The bottomhole pressure should be maintained at a minimum value compared to the reservoir pressure in order to obtain the maximum production from the well.

A measurement of the depth to the liquid level can be made to aid in the determination of the producing rate efficiency of a well. In addition, consecutive, periodic fluid level tests and casing pressure measurements can be performed to obtain the pressure buildup in the wellbore when a well is shut-in. This information allows the operator to determine several important reservoir and wellbore characteristics. Thus, the operator has need for a knowledge of the distance to the liquid level, and preferably this information should be presented automatically in a display or printout convenient for the operator.

The use of echo sounding to determine fluid depth is well-known in the art. This is shown in U.S. Pat. No. 2,190,141 to Walker, U.S. Pat. No. 2,232,476 to Ritzman, and U.S. Pat. No. 4,318,298 to Godbey et al. It is well known that an acoustic pulse can be transmitted down the borehole and reflections from the collars can be counted. By determining the number of collars between the wellhead and the surface of the fluid, a calculation can then be made of the depth to the fluid surface knowing the average length of each tubing joint. One example of a current echo sounding system in wide use is a Model D Echometer made by Echometer Company of Wichita Falls, Tex. This device produces a strip chart record of the reflection data, but the operator is tasked with the job of selecting the reflection from the surface of the liquid and counting the collar reflections from the tubing collar by use of a mechanical spreader.

Acoustic pulse generators, typically called "guns", for use in echo sounding are shown in U.S. Pat. Nos. 4,637,463, 4,408,676, 3,915,256, and 3,316,997 all to McCoy.

Prior art patent U.S. Pat. No. 4,793,178 to Cebuhar et al. describes the process of echo ranging and includes a technique for automatically detecting the liquid level echo in a reflection signal.

In conventional echo sounding techniques, the signals from the collar reflections often disappear in the noise before the liquid level reflection is received. Conventional filtering can reduce the noise level and extend the extraction of the collar reflections to some extent, but in many applications the reflections, even in a filtered signal, cannot be completely resolved.

The difficulty of determining the existence of reflections from collars is most acute in deep wells or wells in which there is considerable noise. In addition, there can be numerous other types of reflectors downhole, such as tubing anchors, perforations and deposits. These reflections can produce a signal that is similar to a liquid level reflection. In view of these difficulties, there exist a need for a method of processing, filtering and displaying echo sounding data in such a way to better detect and count the collar reflections, detect the liquid surface reflection and allow the operator to select the liquid surface reflection from among a number of similar reflections.

SUMMARY OF THE INVENTION

A selected embodiment of the invention is a method for evaluating echo reflections produced in response to the transmission of acoustic energy down a borehole in the earth wherein the borehole has a tubing string installed therein which comprises a plurality of interconnected tubing joints. The reflections of the acoustic energy are detected as a return signal. The return signal is stored. A waveform representing the return signal is displayed on a screen along a dimension which is proportional to time. A listing of known depths for one or more fixed reflectors located in the borehole are stored. A marker is displayed on the screen for each of the known reflectors in conjunction with the displayed waveform wherein each of the markers are positioned along the dimension at a position corresponding to the depth in the borehole for the marker.

In a further aspect of the present invention there is disclosed a method for acquiring and displaying data associated with the borehole. The echo returns are monitored to produce a return signal. The return signal is digitized to produce a set of digital samples representing the return signal. The digital samples are stored. The digital samples are then displayed on a screen as a waveform corresponding to the return signal.

In a still further aspect of the present invention there is displayed on the display screen concurrently with the waveform representing the digital samples a marker which can be positioned along the waveform at any point thereof and receiving an input from an operator for moving the location of the marker along the waveform.

BRIEF DESCRIPTION OF THE FIGURES

For a more complete understanding of the present invention and the advantages thereof, reference is now made to the following description taken in conjunction with the accompanying original drawings in which:

FIG. 9 is a flow diagram illustrating the summation of the collar counts, the calculation of depth and the display of the calculated depth, FIG. 11 is a detailed flow diagram illustrating a technique for measuring collar rate frequency by examining zero crossovers, FIG. 12A is a flow diagram illustrating a technique for detecting collar frequency rate by use of the process of correlation, FIG. 12B is a set of curves (A, B and C) illustrating the process of correlating a signal with itself and producing a period T corresponding to the basic frequency in the signal, FIG. 13A is a flow diagram illustrating a technique for detecting collar frequency rate by the use of spectrum analysis, FIG. 13B is a flow diagram illustrating a technique for detecting collar frequency rate by the use of spectrum analysis, FIG. 14 is a screen display for well data, FIG. 15 is a screen display of a original acoustic signal including a marker showing an automatically detected liquid level point for a liquid level reflection pulse, FIG. 16 is a screen display illustrating original acoustic data with a movable marker set to a selected point for the liquid level reflection, markers illustrating the selected data segment which is measured to obtain a collar frequency rate, an enlargement of the liquid level reflection pulse, together with calculated depth to the liquid level surface, an illustration of data filtered at the collar reflection rate measured for the midpoint sample and a corresponding illustration of the original acoustic signal for the midpoint sample, FIG. 20 is a flow diagram illustrating a process for determining which of multiple reflection pulses is the reflection from the surface of the liquid, FIG. 22 is a flow diagram illustrating the operation of displaying known reflectors with markers on a waveform of the acoustic signal together with markers representing possible liquid level reflection pulses.

FIG. 23 is a flow diagram illustrating a signal processing operation in which the acoustic velocity of a sonic pulse in a borehole is determined by extracting a collar frequency from a segment of an echo return signal, FIG. 24 is a flow diagram illustrating a signal processing operation in which spectrum analysis is used in an accelerated processing technique to determine a collar reflection frequency and from that t determine depth to a liquid surface, FIG. 25 is a flow diagram illustrating a signal processing operation in which depth to a liquid surface is determined by measuring a collar frequency for a segment of the data signal.

DETAILED DESCRIPTION OF THE INVENTION

Figure 1:
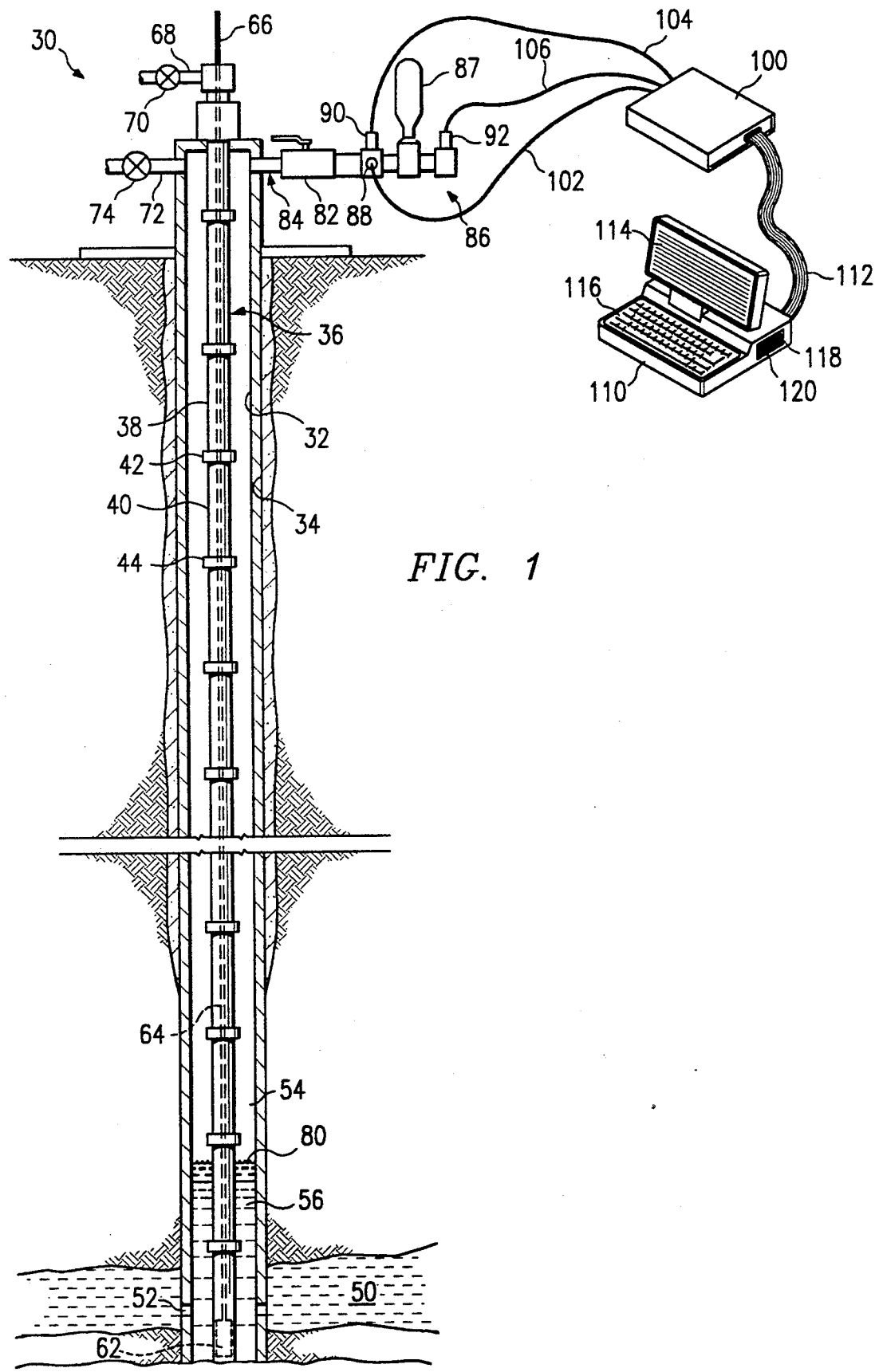
FIG. 1 is a perspective view of a wellhead installation and a well bore in the earth showing an acoustic gun installed at the wellhead together with multiple cable connections to an electronic module which is in turn connected to a portable computer.

The present invention is used for the purpose of gathering and displaying information relating to the production of fluids from boreholes. Typically, this is applied to the production of oil and gas from a well. In the majority of producing wells, the liquid is lifted from the reservoir to the surface by a reciprocating pump mounted within a string of tubing. The basic configuration of the well together with the apparatus for carrying out the present invention is illustrated in FIG. 1. A conventional wellhead 30 includes a casing 32 mounted within a borehole 34. A tubing string 36 is positioned within the casing 32. The tubing string 36 comprises a plurality of tubing joints, such as 38 and 40, which have respective tubing collars such as 42 and 44. The collars interconnect the tubing joints and have a greater outside diameter than the body of the tubing joints.

The casing 32 and tubing string 36 extend into the earth down to a formation 50 which contains hydrocarbons, which may be liquid and/or gas. The hydrocarbons flow through perforations 52 in the casing 32 into an annulus 54 which is between the casing 32 and tubing string 36. The hydrocarbon flow may form a column of fluid 56 within the annulus 54. Fluid 56 likewise flows through the open lower end of the tubing string 36 to within the joints of the tubing string.

A pump 62 is positioned within the tubing string 36. The stationary portion of the pump is supported by a tubing seating nipple. The moving portion of the pump is supported by a pump rod 64 which extends to the surface and is connected to a polished rod 66 which extends through the top of the wellhead assembly 30. A pumping unit (not shown) reciprocates the polished rod 66 to raise and lower the pump 62 and thereby lift the fluid 56 through the tubing string 36 to the wellhead 30 at the surface.

The fluid lifted through the tubing string 36 passes through a tubing flow line 68 and a valve 70 to a pipeline or storage tanks (not shown). Gas produced from the formation 50 normally passes through the tubing and the annulus 54 and outward from the wellhead 30.

The fluid 56 within the casing 32 has a liquid level surface 80. A principal objective of the present system is to measure the depth to the liquid level surface 80 from the wellhead assembly 30.

A valve 82 provides an interconnection between the casing annulus 54. A sonic gun 86, described in detail below, is connected so that it has access through the valve 82 into the casing annulus 54. The gun 86 includes a microphone connector 88 to an internal microphone, a pressure connector 90 to a pressure transducer and a solenoid connector 92 to a solenoid valve which releases compressed gas from a reservoir 87 into the casing annulus 54.

The apparatus used in conjunction with the present invention further includes an electronic module 100 which is connected to the gun 86 by a microphone cable 102, a pressure transducer cable 104 and a solenoid cable 106. These cables are respectively attached to connectors 88, 90 and 92.

A portable computer 110 is connected by a ribbon cable 112 to the electronics module 100. The computer 110 is preferably a Toshiba Model T1200, a battery powered portable computer which has two diskette drives. Other models of computers which could provide at least equivalent functionality could likewise be used. The ribbon cable 112 is connected to the bus of the computer 110 through a card installed in the expansion slot of the computer. The computer 110 includes a display screen 114 and a keyboard 116. The computer 110 further includes diskette drives 118 and 120 for receiving diskettes which provide the program for operating the computer and the electronic module and for storing the entered and collected data.

As a brief summary, in operation, the operator inserts a program diskette in drive 118 and a data file diskette into the drive 120 of the computer 110. These are the first steps in the operational procedure in conjunction with the present invention. After the program in computer 110 has become operative, an acoustic energy pulse is generated by the gun 86 and transmitted down the casing annulus 54. This pulse can be initiated by a command signal from the computer 110 in response to an operator command or the gun 86 can be manually fired by the operator. At the same time, a microphone, which is mounted within the gun 86, picks up the acoustic pressure variations within the gun 86 which is open to the annulus 54. These pressure variations, in the form of acoustic energy, are detected by the microphone which produces an electrical signal, termed a return signal, which is transmitted through the cable 102 to the electronics module 100. Within the module 100 the return signal is digitized and then provided through the cable 112 into the computer 110 where the digital samples of the return signal are stored.

When the acoustic pulse produced by gun 86 is transmitted down the annulus 54, it strikes the tubing collars, such as 42 and 44, and produces a reflection from each of the collars A reflection is further produced by the liquid level surface 80. In addition, should there be any other objects, such as tubing anchors, within the annulus 54, a reflection will be produced by each of these objects Anything that changes the cross sectional area of the annulus, either larger or smaller, produces a reflection that is within the return signal When the return signal has been digitized and stored, it is then processed by the computer 110 to detect the time of generation of the acoustic pulse as well as the time of occurrence for the liquid level reflection. These are relative times measured for the acoustic signal with respect to the generation of the acoustic pulse. In one mode of operation of the present system, a segment of data is selected from approximately the midpoint of the return signal and this segment of data is processed to determine the rate of receipt of the collar reflections. The tubing joints such as 38 and 40 have a length that is known for the particular well which is being analyzed By knowing the time between the time of occurrence of the generated sonic pulse and the time of occurrence for the liquid level reflection, the rate of receipt of collar reflections, together with the average joint length, these three numbers can be multiplied to produce the distance between the wellhead 30 and the liquid level surface 80. The present system includes other modes of operation and numerous screen displays as well, all of which are described in further detail below.

In the production operation of a well for retrieving hydrocarbon fluids and gases from a formation, the rate of production is dependent upon numerous variables When these variables are known, it is possible to modify operating conditions to optimize the production of fluid from the well. One of these basic parameters which must be known is the distance from the wellhead down to the liquid level surface 80. This distance can be measured, as described above, or by the use of alternative techniques, a number of which are described below. The present system further provides for the measurement of pressure at the wellhead. This is termed casing pressure. The casing pressure must be considered together with the liquid level depth to obtain downhole pressures. By conducting further operations, described below, and having a knowledge of parameters for a particular well, it is possible to calculate optimum production parameters for producing the maximum amount of fluid from the well.

The hardware, method of operation and processing of data for carrying out these objectives are described below.

Figure 2:
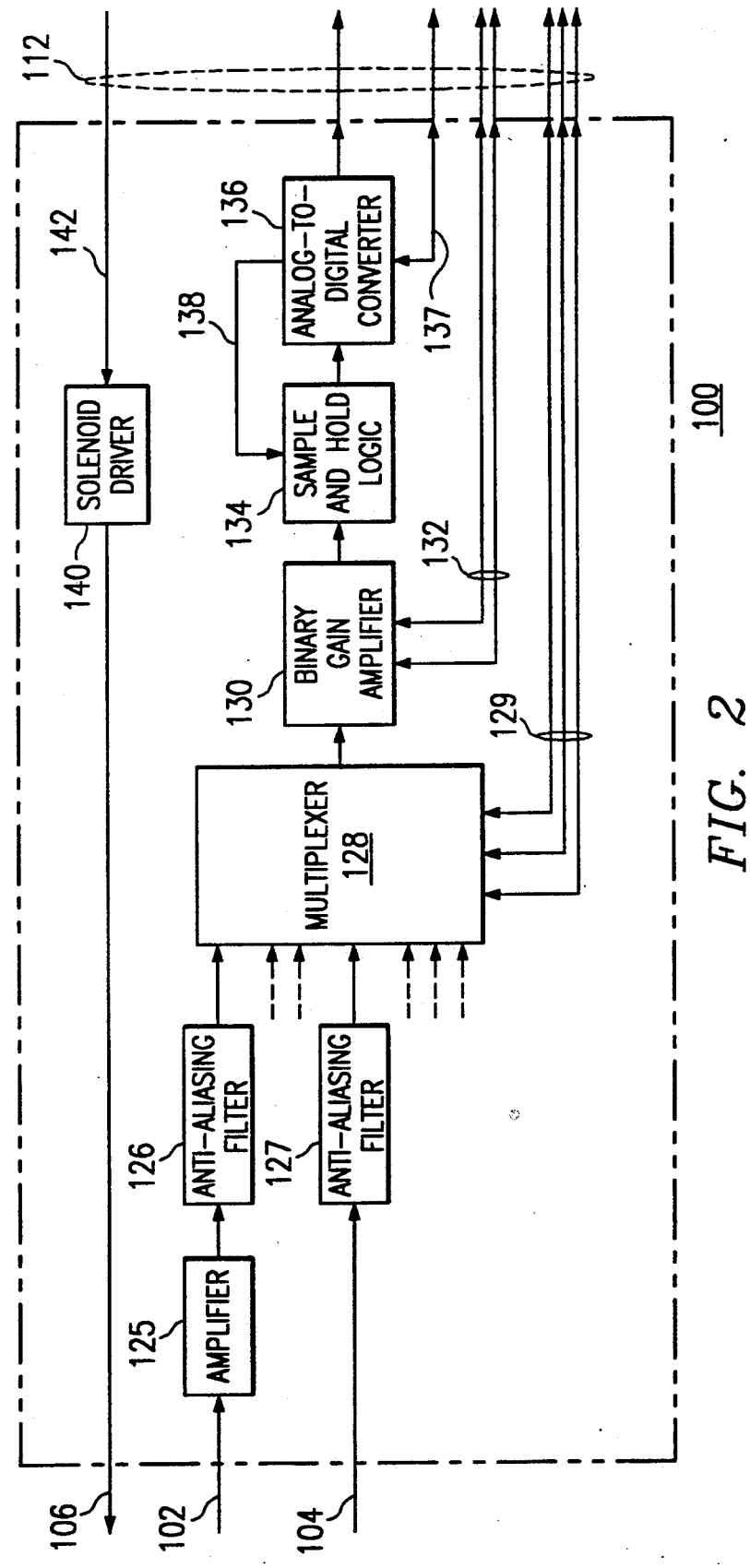
FIG. 2 is a detailed block diagram illustrating the internal components of the electronic module shown in FIG. 1.

The electronics module 100 is described in a detailed block diagram in FIG. 2. The microphone cable 102 is connected to an amplifier 125 which has the output thereof connected to an anti-aliasing filter 126. The amplifier 125 has a fixed gain of approximately 20. The cable 104 is connected to an anti-aliasing filter 127. The output of filter 126 is provided as an input to a multiplexer 128. Likewise, the output of filter 127 is provided as one of the inputs to multiplexer 128. Eight inputs are provided to the multiplexer 128 and the remaining inputs can be utilized for other measurements such as wellhead temperature, battery voltage level for the electronics module, and other parameters associated with the analysis equipment or well production. The multiplexer 128 receives three control lines 129 which are a part of the cable 112. The lines 129 provide control inputs (three bits) which select one of the eight inputs for connection to the output.

The output of the multiplexer 128 is provided to the input of a binary gain amplifier 130. The amplifier 130 has four gain levels which are 1, 8, 64 and 512. The selection of the gain is provided by input control signals (two bits) provided through lines 132, which are a part of the cable 112. The output from the binary gain amplifier 130 is provided to a sample and hold circuit 134. An analog signal sampled by the circuit 134 is provided to an analog-to-digital converter 136. The sample and hold circuit 134 is controlled through a line 138 from the converter 136. The operation of the converter 136 is controlled by a command signal received through a line 137, which is a part of the cable 112, from the computer 110.

In operation, the microphone signal is provided through cable 102 and the pressure signal is provided through cable 104. These signals are provided to the inputs of the multiplexer 128 which selects one of its multiple inputs for transmission therethrough to the binary gain amplifier 130. Each digital sample of the incoming signal is produced in a two-step process using the amplifier 130. In the first step, the gain of the amplifier 130 is set to eight. The signal at this gain level is provided to the sample and hold circuit 134 and digitized by the converter 136. The resulting signal is then examined by the computer 110 to determine its absolute amplitude. If the amplitude is very small, the gain on the amplifier 130 is changed to either the 64 or 512 level as needed to produce a larger signal for proper operation of the sample and hold circuit 134 and converter 136. If the amplitude of the signal produced in the first step is at the maximum which can be indicated by the converter 136, then the gain of the amplifier 130 is reduced to the 1 level.

In the second step of the process of producing a digital sample of the incoming signal, the binary gain amplifier is operated at the selected gain level determined in the first step. The signal from the multiplexer is then amplified at this gain level and provided to the sample and hold circuit 134 and then to the analog-to-digital converter 136 for producing the digital sample of the signal that is stored for further analysis. When the signal has been produced in a digital format, it is then divided, in computer 110, by the gain level of the amplifier 130 to produce the absolute amplitude of the signal as it existed at the output of the transducer, such as the microphone in the gun 86. Thus, the signal stored in the computer 110 represents the actual amplitudes of the original signal produced by the transducer.

Further referring to FIG. 2, when the operator inputs a command to the computer 110 to start the echo sounding operation, a resulting signal is produced by the computer 110 and transmitted through the cable 112 on a line 142 to the solenoid driver 140. The driver 140 produces an amplified signal which is transmitted through cable 106 to the solenoid within the gun 86. This activates the solenoid within the gun 86 to produce a sonic pulse which is transmitted down the annulus 54 of the borehole 34. The acoustic signals within the annulus 54 at the wellhead are then detected by the microphone within the gun 86 and provided through the line 182 for digitization as described above and storage in the computer 110.

The ribbon cable 112 is connected to an I/O card within the computer 110. This I/O card is connected to the computer bus which, for the described embodiment, is an IBM PC compatible system. The I/O card has ports for interfacing the cable 112 to the computer bus. An interface card of this type is well known in the industry.

Figure 3:
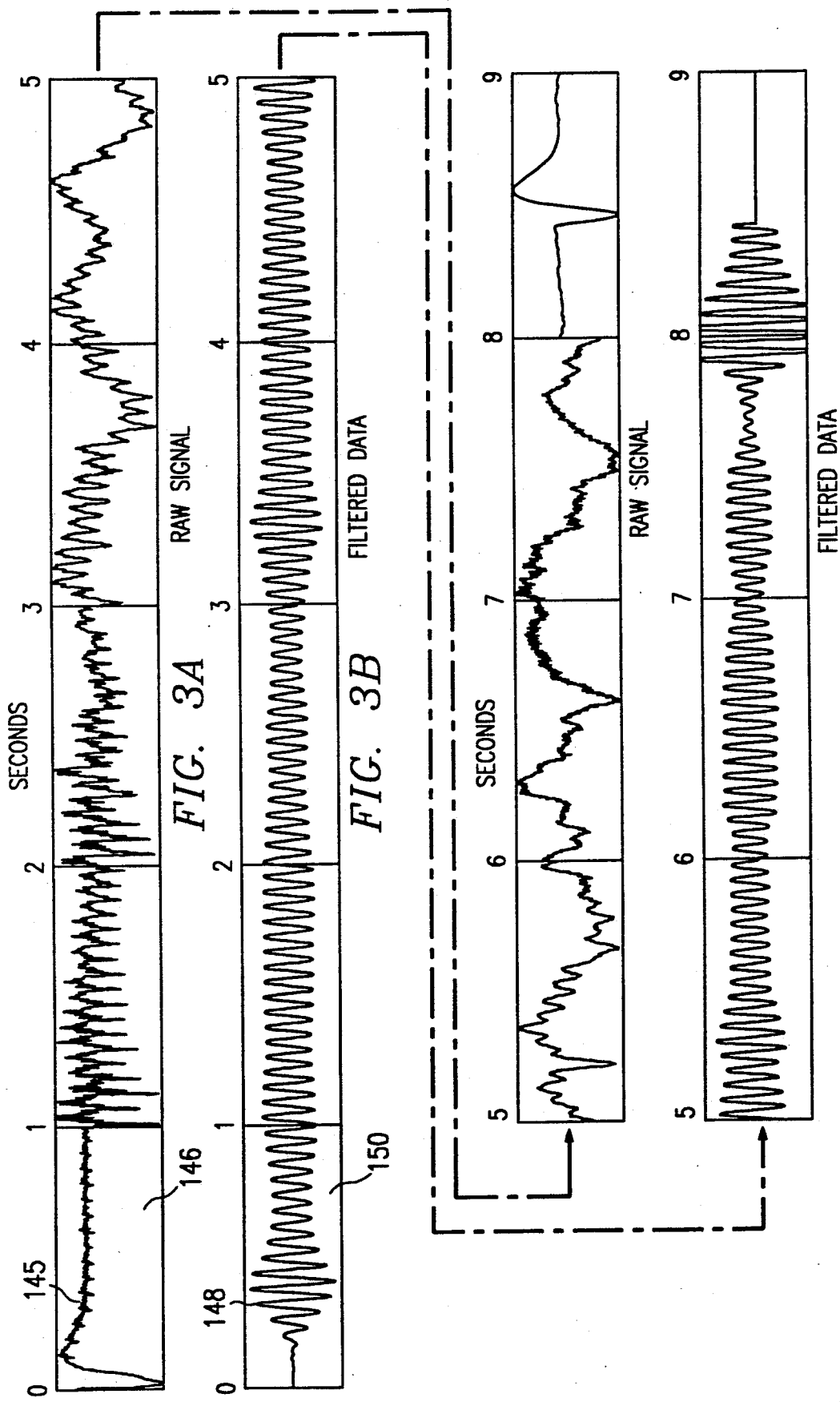
FIG. 3A is an illustration of an original data signal recorded for an echo-ranging acoustic shot.
FIG. 3B is an illustration of the data shown in FIG. 3A after it has been filtered with a narrow-band filter.

FIGS. 3A and 3B are illustrations of signals produced and used in conjunction with the present invention. FIG. 3A is an illustration of an original acoustic signal which is received, digitized and stored in the computer 110. The illustration of this signal is not in true proportion to the original amplitude. The amplitude has been normalized to present the signal in the display. The segment of data in FIG. 3A between 0 and 1 second has a scale to show the very large amplitude for the original acoustic pulse. FIG. 3B illustrates the signal shown in FIG. 3A after it has been filtered by a narrow band, bandpass filter, and gain equalized. This is a signal 148 in a display 150. The reflections from the collars can be easily seen in FIG. 3A as spikes at the earlier times in the signal. However, at later times it becomes more difficult to see any particular collar reflection. This is due to the attenuation of high frequency signal components at greater depths and times.

In FIG. 3B, each collar reflection corresponds to a single cycle of the filtered signal 148. This signal has been bandpass filtered with a band width of approximately 4 Hz with the passband centered at approximately the rate of receipt of the collar reflections. The preferred bandwidth is 4 Hz, but a bandwidth range of 3-6 Hz can likewise produce good results. Filtering the original data with a narrow passband filter having a center point frequency at the rate of receipt of the collar reflections extracts the most important information in the signal, namely the collar reflections, while reducing extraneous signals and noise. Further reference will be made to the signal wave forms shown in FIGS. 3A and 3B in the following discussion.

Figure 4:
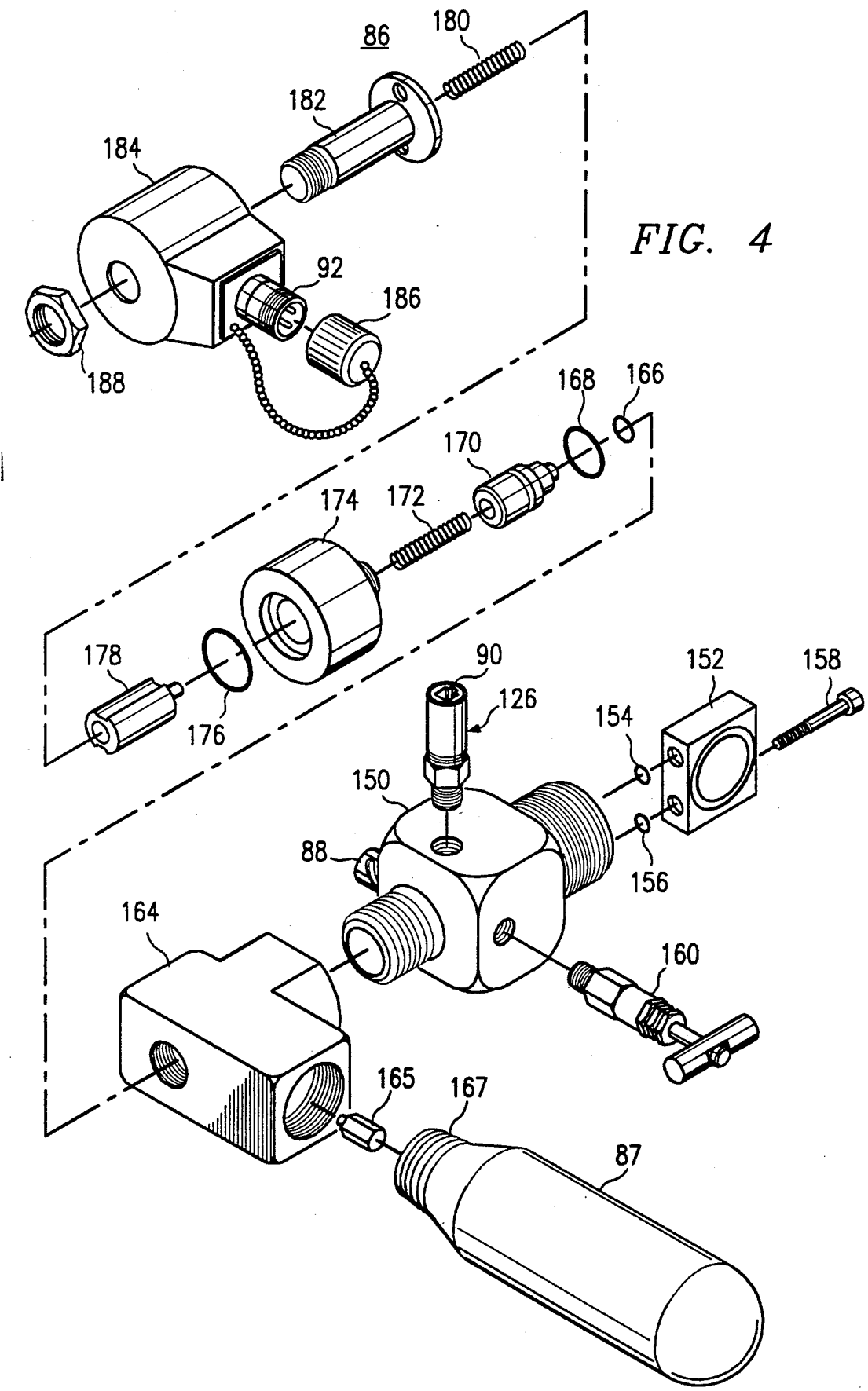
FIG. 4 is an exploded view of the acoustic gun shown in FIG. 1.

Referring now to FIG. 4, there is illustrated in detail the acoustic gun 86 shown in FIG. 1. This device receives compressed gas, such as carbon dioxide, from the reservoir 87 which is connected to the gun 86. When a solenoid within the gun 86 is activated, a pulse of compressed gas is transmitted to the annulus 54 for transmission down the borehole. Referring to FIG. 4, the gun 86 includes a sealed bolt 158 which attaches a microphone 152 to within a microphone housing 150. O-rings 154 and 156 are positioned within corresponding openings of the microphone 152. The microphone 152 receives pressure on both sides of the diaphragm so that only differential pressure pulses are detected. Connector 88 is the microphone connector.

The housing 150 further includes the connector 90 which is connected to a pressure transducer 126 which is in turn connected to the pressure cable 104. A bleed valve 160 releases pressure within the gun 86 so that it can be easily disconnected from the valve 82.

The microphone housing 150 is threadedly connected to a valve housing 164. The gas pressure reservoir 87 is mounted to the valve housing 164 by means of threads 167. An orifice 165 is mounted within the housing 164.

A solenoid body 174 receives a valve spring 172, a gas valve 170, an O-ring 168 and an O-ring 166.

A coil housing 184 receives a plunger housing 182, a plunger spring 180, a plunger 178 and an O-ring 176 The coil housing 184 has the solenoid connector 92 mounted externally thereto and is provided with a connector cap 186. A nut 188 is secured to the plunger housing 182 for joining together the housing 184 and body 174 together with the intervening components.

When the gun 86 receives a command signal through the solenoid connector 92, the plunger 178 is activated to release gas from above piston 170 which allows the pressurized gas in reservoir 87 to expand through valve housing 164 into the casing annulus 54. After the pulse of gas is released, the plunger 178 and valve 170 return to their original positions to await a further activation signal.

Although the gun 86, shown in FIG. 4 is presented as an illustrative embodiment for a gas gun, there are numerous other types of guns which could likewise serve the purpose for the present invention. These are shown in U.S. Pat. Nos. 4,637,463, 4,408,676, 3,915,256, and 3,316,997 all to McCoy, and each of which is incorporated herein by reference.

The gun 86 produces a compression pulse which is transmitted down the annulus 54 of the borehole. However, if the well has casing pressure greater than atmospheric pressure, a gun can be used to release a pulse of gas from the well which creates a rarefaction pulse that is transmitted down the borehole. A rarefaction pulse creates rarefaction echoes from restricting in the borehole just as a compression pulse creates compression echoes from restrictions in the borehole. By controlling the gun, an operator can select whether to produce a compression or rarefaction pulse. A gun for producing a rarefaction pulse is well known in the art.

Many of the functions of the present invention are carried out by operation of the computer 110 in executing stored programs.

As described above, an operator loads a program diskette and a data diskette into the computer 110 with the system connection shown in FIG. 1. Power is applied to the equipment and the basic program is loaded for operation. Referring to FIG. 5, operation is begun with a main menu entry block 204. This leads to an operational block 206 which produces a display 208 for well parameters. The display 208 is shown in FIG. 14. The operator enters each item of information for the well and these parameters are stored in a file defined for this well. In a future operation with this well, the stored parameters are used without need for further entry by the operator, unless a parameter needs to be changed.

FIGS. 5–13 are flow diagrams illustrating the operation of the present system for acquiring, processing and displaying data, and other parameters, in conjunction with acoustic echo sounding. FIGS. 14–19 and 21 are screen displays which illustrate data information used in conjunction with the operation of the present invention. The various screen displays will be referenced in conjunction with the description of the operations in the flow diagrams.

The described system utilizes digital filtering for the acquired acoustic signal. The process of digitally filtering digitized signals is well known. A principal filter used herein is termed a "Butterworth" filter. Another filter is termed "finite impulse response". Information concerning filters and specific information concerning the implementation of digital filters is given in the following references.

1. *Geophysical Signal Analysis*, Robinson, Eders A., and Tritel, Sven; published by Prentice-Hall.
2. *Digital Filter Design Handbook*, Taylor, Fred J; published by Dekkar Publishing House.
3. *Analog and Digital Filters, Design and Realization*, Lam, Harry; published by Prentice-Hall.
4. *Information Transmission, Modulation and Noise*, Schwartz, Mischa; published by McGraw Hill Publishing Co.

A commercially available computer program which can perform digital filtering of data is entitled "DA-DiSP 2.0" by DSP Development Corporation located in Cambridge, Mass.

Figure 5A:
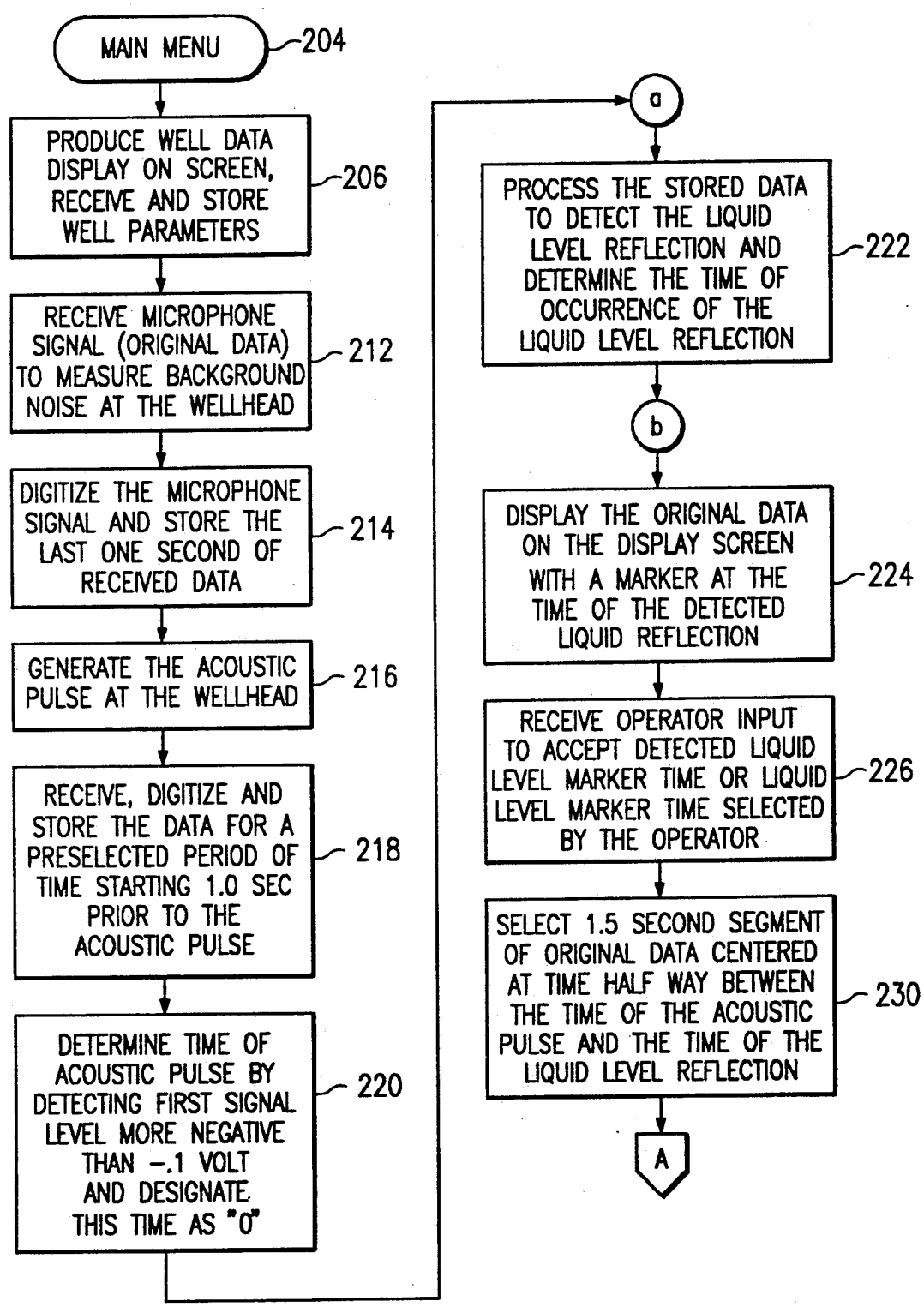
FIGS. 5A is a flow diagram illustrating the generation, collection, digitizing, storing and initial processing of an acoustic echo signal.

Referring to FIG. 5A, as noted, the operation begins with a main menu entry block 204. Following block 206, entry is made to an operational block 212 in which the computer 110 receives the signal from the output of the microphone 152 prior to initiation of the acoustic pulse. This is termed the noise signal. The data in this signal is stored for a one second running time period. This data is used to provide a reference to the background noise for determining the existence of valid data.

Next, the operation transitions to an operational block 214 in which the noise signal is continuously digitized and stored.

At the direction of the operator, referring to an operational block 216, the computer generates a command which is transmitted through the electronic module 100 to the solenoid within the gun 86. This activates the solenoid so that the gun 86 produces an acoustic pulse which is transmitted down the annulus 54. For the sonic gun 86 described herein, there is produced a compression pulse which is transmitted down the borehole. However, by using a gun that can vent gas from the well the operator can produce a rarefaction pulse.

Following generation of the acoustic pulse, the system enters an operational block 218. Within this block, the system digitizes and stores the data for a preselected period of time which begins 1.0 second prior to the acoustic pulse and continues for a selected time period. This time period is determined by the depth of the well or the depth of the pump so that the signal is terminated after the maximum amount of time for the lowest desired echo returns.

The next operational step, step 220, is carried out by the computer 110 to determine the time of occurrence within the data stream of the return signal for the acoustic pulse which was generated in reference to operational block 216. This is done by examining the original data from the beginning and detecting the first signal which has a level that is more negative than −0.1 volt. In the present system, the compression acoustic pulse produces a negative going return signal from the microphone. With a different configuration, or different acoustic pulse, the acoustic pulse signal could be positive going and the detection technique would be the same except for the polarity. When this point is detected, it is designated as the time of occurrence in the data stream for the acoustic pulse.

The next step in the signal processing operation is to detect the liquid level reflection within the data signal. This is carried out by an operational block 222 which is positioned between the flow chart points a and b. A number of processing techniques can be utilized to accomplish the function described in block 222. These optional approaches are shown in FIGS. 10A–E. Upon completion of the operations in block 222, there is produced a time of occurrence for the liquid level reflection within the data signal. This time is relative to the time of occurrence of the acoustic pulse.

It is noted that the processing operations carried out in operational blocks 220 and 222 are performed with the digital data which has been received and stored from the microphone within the gun 86.

Following operational block 222, the system enters an operational block 224 in which the original data signal is displayed together with a marker 228 at the detected liquid level reflection time. This display is shown in FIG. 15. The marker 228 is the vertical dashed line shown between the 8 and 9 second time markers. This selection of position for the vertical marker is done automatically by operation of the system. The time of occurrence of the liquid level reflection is defined as the beginning of the signal which was reflected from the liquid back to the surface, this time often being measured from the time of the initial acoustic pulse. The liquid level reflection pulse may be of a relatively long duration.

From operational block 224, control is transferred to operational block 226. Within this block the system receives an operator input, if such input is made, to move the marker 228 shown in FIG. 15 to a different point on the original data signal. It is possible that the automatic selection of the liquid level reflection will be in error due to the existence of other reflectors in the annulus or possibly noise. An operator can then move the marker to a desired point on the original data signal and this point will then be designated as the liquid level reflection time of occurrence. In FIG. 15, this liquid level marker, the vertical dashed line, is indicated by the reference number 228.

The process thus far described in reference to FIG. 5A comprises taking a single acoustic shot at the wellhead and processing the data produced in that one signal. However, under certain circumstances, the return signal may be very weak or there may be excessive noise which covers the signal. For example, in an extremely deep well, the return signals may have such a low amplitude that they are difficult or impossible to detect. Likewise, if the acoustic information is collected in a well that has substantial background noise, this noise may cover the true signals. One method for enhancing the amplitude of the true signal and reducing the noise is to generate a sequence of acoustic pulses and add these together on a point-by-point basis. The noise tends to be more random and the signal tends to be more uniform. Thus, the noise is averaged to a lower level in the resulting signal and the true signal is increased in amplitude. This process is described in reference to FIG. 5B. The process in FIG. 5B replaces blocks 216 and 218 described in reference to FIG. 5A. Continuing from block 214, entry is made to an operation block 244 in which the collection step (N) is set to 1 for collecting the first of the multiple data signals. In the present example, the number of data signals collected is four. This provides essentially a signal enhancement of 6 db. Each doubling of the number of collected signals provides another 3 db enhancement of the signal. Thus, if eight signals are collected, the signal enhancement would be essentially 9 db.

Figure 5B:
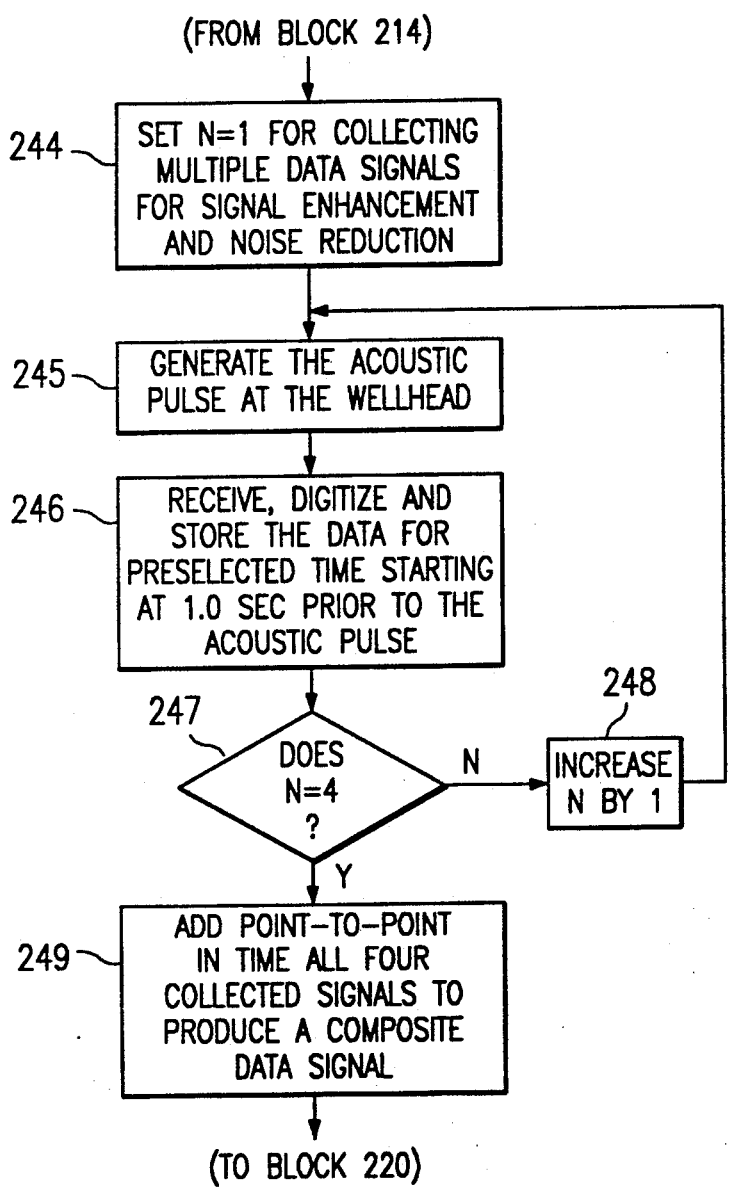
FIG. 5B is a flow diagram illustrating a technique for collecting multiple signals and combining them to enhance signal resolution.

Referring to FIG. 5B, following block 244, entry is made to an operation block 245 in which the acoustic pulse is generated at the wellhead and transmitted down the annulus of the well. Continuing to block 246, the acoustic signal in the wellhead is monitored, digitized and stored as a data signal. This is begun at a time approximately 1.0 second prior to the acoustic pulse. Continuing to a question block 247, an inquiry is made to determine if the fourth signal has been collected. If not, the no exit is taken to an operation block 248 which increases the value of N by one. Control is then returned to the input of operation block 245 to generate the next acoustic pulse for producing the next data signal. The operations performed in blocks 245, 246, 247 and 248 are repeated until four data signals are collected and stored.

When the value of N reaches four, the yes exit is taken from question block 247 and control is transferred to an operation block 249. Within the block 249, the four signals are added together on a point-by-point basis in which data samples occurring at the same point in time, relative to the time of occurrence of the acoustic pulse, are added together. The result of the point-by-point addition is a summation composite data signal in which the random noise level has been reduced and the true signal amplitude has been increased. This composite data signal is processed in the same manner as described above and subsequently for a single data signal, which is described in reference to FIG. 5A.

After the time of occurrence for the liquid level reflection has been selected, either through the operation described in reference to operational block 222, or by the operator selection, control is transferred to an operational block 230 in FIG. 5A. Within this block, a 1.5 second segment of the original data is selected with the segment centered at approximately the half-way time between the time of the acoustic pulse and the time of the liquid level reflection. This is shown in reference to a display 232 in FIG. 16. The selected data segment 234 is between markers 236 and 238. Further shown in FIG. 16 is an expanded display 240 showing the liquid level reflection in greater detail together with the marker 228. The data segment 234 is shown in an expanded display 242.

Figure 6:
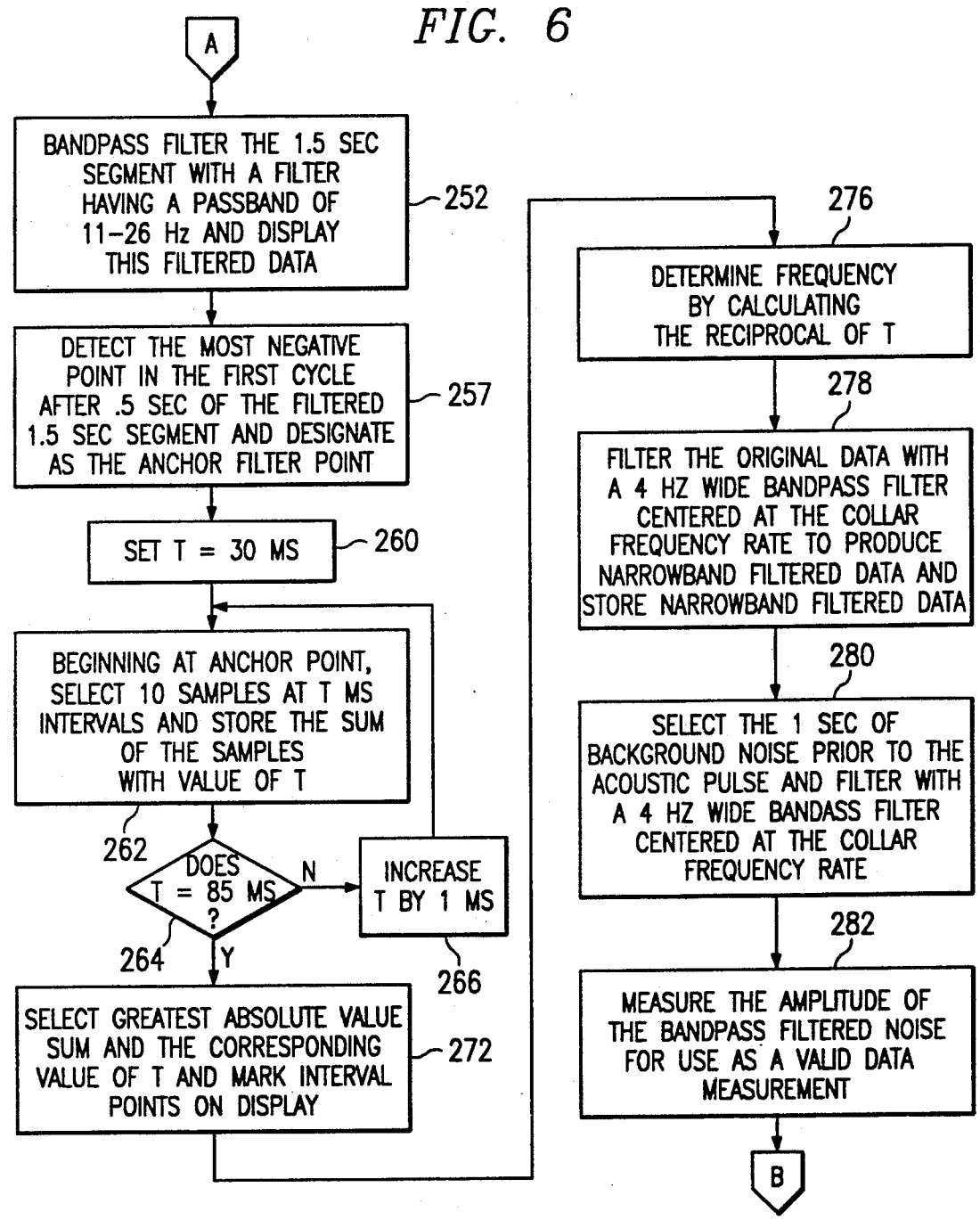
FIG. 6 is a flow diagram illustrating the processing and filtering of the original acoustic signal.

Further operation of the system is described in reference to FIG. 6. An operational block 252 provides the function of band pass filtering the 1.5 second of selected data segment 234 with a band pass filter having a band pass between 11 and 30 Hz. This produces a filtered data signal 254 which is illustrated in a display 256 shown in FIG. 16. The objective of the operations carried out in the flow diagram shown in FIG. 6 is to determine the rate of receipt of collar reflections in the data segment 234. This is done by detecting an arbitrary anchor point within the signal 254 and selecting corresponding points at periodic intervals along the signal to get the best fit for the periodic rate of the signal. The first anchor point is selected in operational block 257 as being the most negative point of the signal following 0.5 seconds after the start of the data segment signal 254. This point is shown by a marker 258 in display 256 of FIG. 16. The first 0.5 seconds of data is not used because a short period of time is required to allow the filter to settle and produce a clean filtered signal.

The next step is to set a variable T (interval) initially equal to 30 milliseconds (ms) as shown in operational block 260. The interval T runs from 30 to 85 milliseconds, which should encompass all reasonable values of T.

After the anchor filter point has been selected, as indicated by the marker 258, and the parameter T has been set to 30 ms, the system transfers to an operational block 262. Within this block there is a selection made for ten samples of the signal 254 at intervals of T ms. These are ten samples taken along the signal 254 beginning at the point indicated by the marker 258. The amplitudes of these ten sample points are summed and this sum is stored along with the corresponding time for T.

Following operational block 262, the system enters a question block 264 which determines if the parameter T has reached the value of 85 ms. If not, the value of T is incremented by 1 ms through an operational block 266. Control is transferred from block 266 back to the operational block 262 to again perform the function of selecting ten sample points beginning with the designated anchor filter point indicated by the marker 258. In this operation, the value of T has been increased from 30 ms to 31 ms. The amplitudes of the sample points are again summed and stored with the corresponding value of T. Following block 262 control is again transferred to question block 264. If T does not yet equal 85 ms, the control is transferred again through blocks 266 and 262. Thus, for each value of T between 30 ms and 85 ms, there will be a corresponding number which is the summation of the amplitudes of the sample points.

When T has reached the value of 85 ms, the question block 264 transfers control to an operational block 272. Within this block, a selection is made for the greatest absolute value amplitude of the sums produced in block 262 and a selection of the corresponding value of T.

Data points on the signal 254 are designated with markers 274 which are spaced along the signal at the interval T. These indicate approximately the closest fit to the minimum amplitude points for each cycle of the signal 254 for ten cycles.

Control is then transferred to an operational block 276. Within this block a collar frequency is produced by taking the reciprocal of the determined value of T. This produces a collar frequency rate, which in the present example shown in display 256 in FIG. 16, is 17.6 Hz.

After the collar frequency rate is determined for the filtered data signal 254, this collar rate is multiplied by the travel time to the selected liquid level reflection time of occurrence to obtain a collar count and this product is multiplied by the average joint length, entered in the well data display 208, to produce a distance in feet between the surface and the liquid level reflection. In display 240 this is shown as a depth of 4,588.0 feet. The number of joints is calculated by multiplying the collar frequency rate by the travel time to the liquid level reflection. This is shown as 148.0 joints in display 240. The travel time for the liquid level reflection is shown in display 240 to be 8.422 seconds.

The depth of 4,588.0 feet is a close approximation to the true depth of the liquid surface 80 based upon the collar reflection rate measured only for the 1.5 second interval of time at approximately the midpoint of the data signal. This produces a measure for acoustic velocity (collars per second). The product of joint length and collar frequency multiplied by two is acoustic velocity. In most applications this is a sufficiently accurate measurement for operational purposes. If the well under analysis is producing gas up the annulus, the pressure and temperature, and composition are essentially uniform or uniformly changing throughout the column. If gas is not being vented, the pressure and temperature in the annulus 54 can have substantial variations in the column. When gas is being vented, the mid-range measurement of the collar rate is representative of the collar rate throughout the well. In this case, the product of the average acoustic velocity, mid-range measurement, and the round trip travel time is very likely an accurate measurement of the depth to the liquid surface. But, if no gas is being vented, a process of counting collars should be used. However, in many cases the best indicator of data accuracy at this stage is whether gas is flowing from the casing. If gas is flowing, the assumed average acoustic velocity is probably quite accurate. But, if the well has no gas flow, the operator should perform an actual count of the tubing collars. In many well analysis procedures, this is all the information that the operator will require. However, the present system provides additional processing analysis, as further described.

Following operational block 276 and production of the various screen displays shown in FIG. 16, control is transferred to an operational block 278. Within this block, the original data, shown as signal 145 in display 146 of FIG. 3A, is band pass filtered with a 4 Hz wide band pass filter centered at the collar frequency rate calculated above for the signal 254. This produces narrow band filtered data for the acoustic return signal, as shown in FIG. 3B. The preferred bandwidth for the band pass filter is 4 Hz, but a range of 3-6 Hz can likewise be effectively used.

Continuing to an operational block 280, the one second of background noise stored prior to the acoustic pulse is filtered with the same 4 Hz wide band pass filter centered at the measured collar frequency rate, or the selected bandwidth in the 3-6 range.

In an operational block 282, the band pass filtered background noise is measured to determine its maximum amplitude. This amplitude is used for a valid data measurement as described below. Basically, whenever the filtered acoustic return signal level drops to the amplitude of the filtered background noise, there is no detectable signal, only noise.

Figure 17:
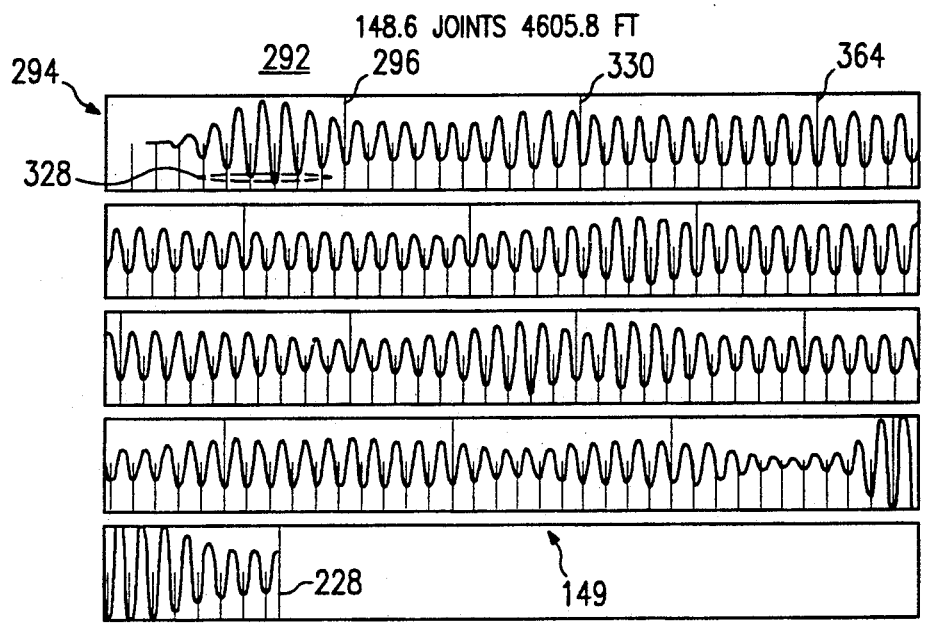
FIG. 17 is a screen display illustration of the entire acoustic data signal after it has been filtered with a narrow band passband filter centered at the collar frequency rate measured for the center data segment together with a marker for each detected collar reflection beginning with the initiation of the sonic gun pulse and extending to the marker for the liquid level reflection, together with a calculation of the liquid level depth based upon a count of the entirety of the collars in the return signal.

The designated starting point for counting collars is shown by a marker 296 in FIG. 17. This counting process is described in reference to signal 149 which is shown in FIG. 17 together with appropriate markers in a display 292 of FIG. 17. There is further shown in display 292 the liquid level marker 228 and a beginning point 294 for the time of occurrence of the acoustic pulse. Note that the signal 149 is the original acoustic data signal which has been filtered with a 4 Hz narrow band filter centered at the collar rate measured for the data segment 234. For the present example, this is a rate of 17.6 Hz.

Figure 7:
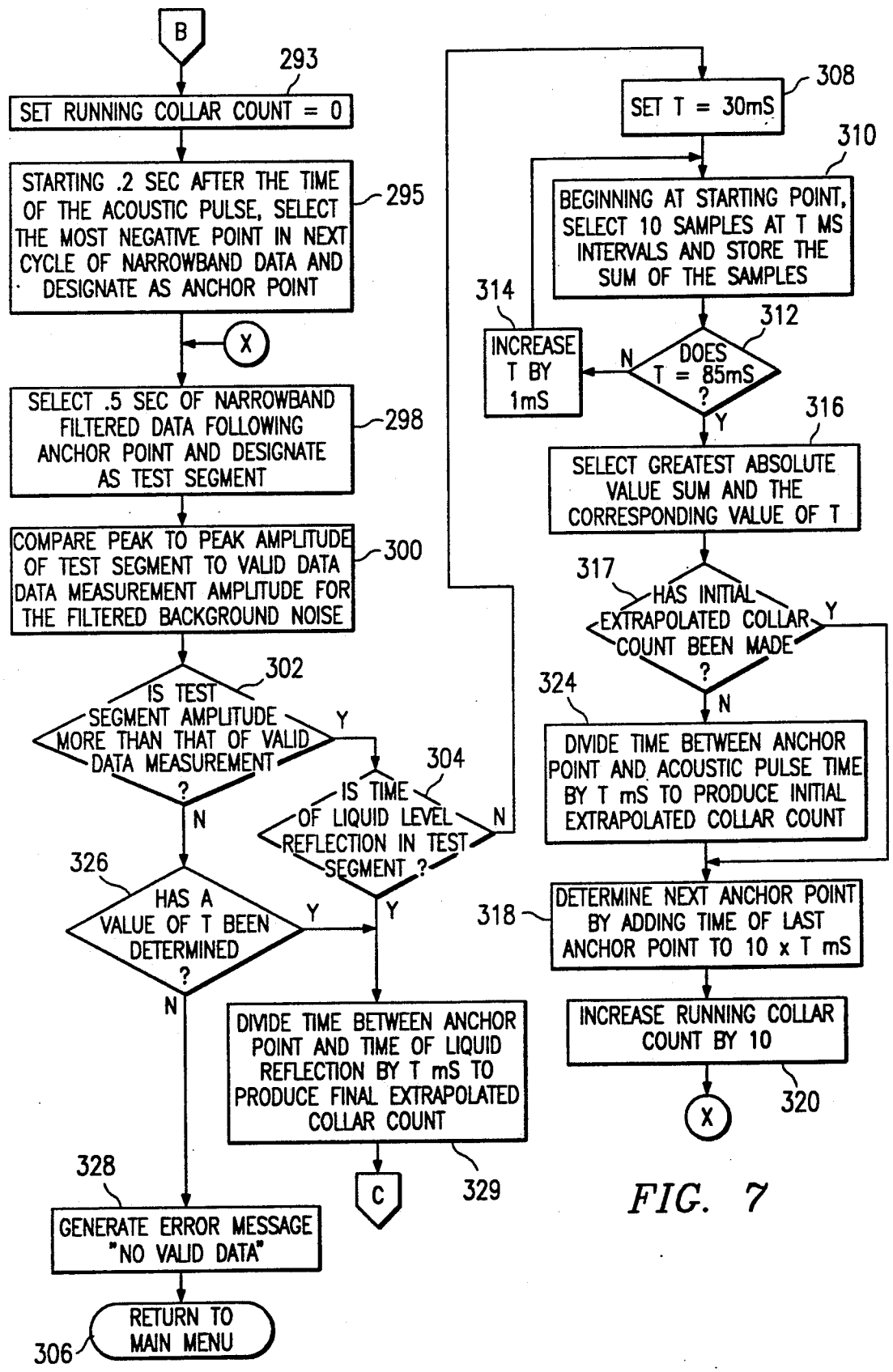
FIG. 7 is a flow diagram illustrating the process of counting collar reflections in the acoustic echo signal.

Following FIG. 6, the operational description for operation of the present system is continued in reference to FIG. 7. The operations described in FIG. 7 comprise counting the cycles of the narrow band filtered acoustic signal, which individually correspond to the collars, such as 42 and 44, of the tubing string 36. Following the entry point B, operations are begun in a block 293. Within this block, a running collar count is set to 0.

Entry is made to an operational block 295 after operational block 293. Within the block 295, the process is begun to count individual cycles of the narrowband signal. The narrowband signal is examined to find the most negative point in the next cycle of narrowband data following 0.5 seconds after the initial acoustic pulse. This is designated as the anchor point. Following block 295, entry is made to an operational block 298 in which the next 0.5 seconds of narrow band filtered data, following the anchor point, is selected and designated as a test segment. Note that this is a 0.5 second segment of data which begins at the anchor point and extends toward the time of occurrence of the liquid level reflection. This is termed moving forward in time.

Following operational block 298, control is transferred to an operational block 300 in which the amplitude is determined for the test segment and this is compared to the valid data measurement amplitude produced for the filtered background noise. When the data signal amplitude drops down to that of the background noise, this indicates that there is no longer a detectable data signal present, but only noise.

Following block 300, entry is made to a question block 302. Within the block 302, an examination is made to determine if the test segment amplitude is more than that of the valid data measurement. If true, the yes exit is taken to a question block 304 in which a determination is made if the time of the liquid level reflection is in the test segment.

If the response is negative in question block 304, the no exit is taken to an operational block 308 in which the value of T is set to 30 ms. Following block 308, entry is made to an operational block 310 which begins at the anchor point, designated above in block 295, and ten samples of the filtered data signal are collected at T ms intervals and the amplitude sum of these samples is produced and stored. This sum is stored in correspondence with the current value of T.

This process of ten sample interval determination is a form of signal correlation.

Following the operational block 310, entry is made to a question block 312 in which an inquiry is made to determine if the value of T is equal to 85 ms. If not, the no exit is taken to an operational block 314 in which the value of T is increased by 1 ms and control is returned to the operational block 310 to produce a new set of 10 samples, sum the samples and store them with the new value of T.

If the value of T is equal to 85 ms, as examined in block 312, the yes exit is taken to an operational block 316. Within the block 316, the greatest absolute value sum is selected for all of the sums produced in the operational block 310. The corresponding value of T is also selected.

The range of value for T of 30 to 85 ms is preferably used only for the first determination of the collar reflection rate, the selection made in block 316. Subsequently the range of T is reduced to plus and minus 1 Hz from the immediate previously determined collar frequency. For example, if the value of T is determined in block 316 to be 56 ms, this corresponds to a frequency of approximately 18 Hz. The range for the next determination of T is then set to 53 ms to 59 ms, which correspond respectively to approximately the frequencies of 19 Hz and 17 Hz. This reduction in the range of T decreases the time required to process the signal.

After completion of the operations in block 316, control is transferred to a question block 317. Within block 317 an inquiry is made to determine if an initial extrapolated collar count has been made. If not, the no exit is taken to an operational block 324. In block 324 the time between the time of the anchor point and the time of occurrence of the initial acoustic pulse is divided by the time T ms to produce an initial extrapolated collar count. This is a count of collars from the wellhead down to the collar corresponding to the time of the anchor point. In most cases, the signal between the initial pulse and 0.2 seconds forward is too large to accurately examine.

If the yes exit is taken from block 317 or the operations in block 324 are completed, control is transferred to an operational block 318. Within the block 318, a new anchor point is determined by adding to the time of the last anchor point, the product of ten times the selected value of T ms. This produces a new anchor point. Following block 318, entry is made to an operational block 320 in which the running collar count is increased by 10. Control is then transferred from operational block 320 back to operational block 298 to repeat the described process.

If the examination in block 302 reveals that the amplitude of the test segment is not greater than that of the valid data measurement sample, the NO exit is taken to an operational block 326. Within block 326 a determination is made if a first value of T has been determined. This is done by the first execution of block 316. If no value of T has been made, control is transferred to an operational block 328 which generates an error message "NO VALID DATA". This indicates to the operator that there can be no processing of data for a collar count because there is no valid data to be examined.

If a value of T has b determined, as indicated in question block 326, the YES exit is taken to an operational block 329. This situation occurs when collar counts have been made in the data signal but the signal has dropped in amplitude until it is no longer valid. In this circumstance, an extrapolation is carried out from the last valid data to the time of occurrence of the liquid level reflection. In block 329 the time between the anchor point and the time of the liquid level reflection is divided by the current value of T to produce a final extrapolated collar count.

The operations carried out in reference to FIG. 7 are completed by transfer from the block 329 into an operational block 378 in FIG. 9. Within this block, a summation is made of the initial extrapolated collar count, the running collar count and the final extrapolated collar count to produce a total collar count for the data signal between the acoustic pulse and the liquid level reflection.

Following the calculation produced in operational block 378, transfer is made to an operational block 380. Within block 380, the total collar count is multiplied by the average joint length to produce a depth measurement from the wellhead down to the liquid level surface 80. The joint count and the depth are displayed in the display 292 of FIG. 17. Further included in FIG. 17 is a marker for each of the detected cycles of the signal 149 together with any extrapolations at the start and ending of the data. Note that the detection and counting of each individual collar reflection, corresponding to a cycle of the signal 149, produced a joint count of 148.6. In comparison, the estimated joint count made by use of only the collar rate measured in the signal segment 234, was 148.0 joints. The calculated depth based upon counting each of the collar reflections in FIG. 17, is 4,605.8 feet. This compares to the calculated depth based upon the midpoint rate calculation of 4,588.5 feet. It can be seen that for this example, the estimated fluid depth based upon the measurement of only a central data point segment is quite close to that determined by examining the entirety of the data signal. This is especially true in wells which produce casing annulus gas and have uniform gas composition in the casing annulus. However, in some cases, the estimate could be off by a substantial margin and the expanded collar count measurement is more accurate. This could occur for wells which have the gas flow turned off.

Returning to FIG. 9, following operational block 380, entry is made to an operational block 382 which displays the liquid level depth measured by counting each of the cycles, together with extrapolation, between the acoustic pulse and the liquid level reflection time as shown in FIG. 17. Following block 382, entry is made to a block 384 for return to the main menu.

. In the above described operation for counting cycles of the narrowband filtered signal, an examination is made for each segment of data to determine is the data is valid, that is, the signal has a greater amplitude than a test measurement of background taken before acoustic shot. As described, if the data is determined to be invalid, the cycle counting is discontinued and an extrapolation is carried out to extend the last measurement to the time of occurrence of the liquid surface pulse. However, an optional approach to that described above is to ignore the valid data measurement steps and continue to count cycles down to the time of the liquid surface pulse. In many cases the data signal is continuous down to the liquid surface pulse. In other cases, the data signal fades in and out, but the cycle counting, as described, detects enough valid cycles to maintain an accurate count of collar reflections, even across segments of signal where there is apparently no valid data. Apparently, the best fit determined by the cycle counting can tolerate substantial signal drop out while maintaining the correct value of the interval T.

Rather than processing the return signal to measure the rate of return of collar reflections for setting the center frequency of the band pass filter, an optional approach, which can be successful with many wells, is to arbitrarily filter the return signal with a band pass filter centered at 17 Hz with a bandwidth from 11 to 30 Hz. It has been found that 17 Hz is a typical collar frequency for many wells. This optional approach can reduce the processing time required for determining depth and is a good approach in many cases. If this option is used and the resulting data appears to be erroneous, the full processing technique described above should be used.

In the following description a compression acoustic signal is referenced as a negative signal. This is done because the signal from the microphone in the gun 86 is inverted for the presently described equipment. However, the acoustic signal could also be a positive signal, and, except for polarity, the processing would be the same.

Figure 8:
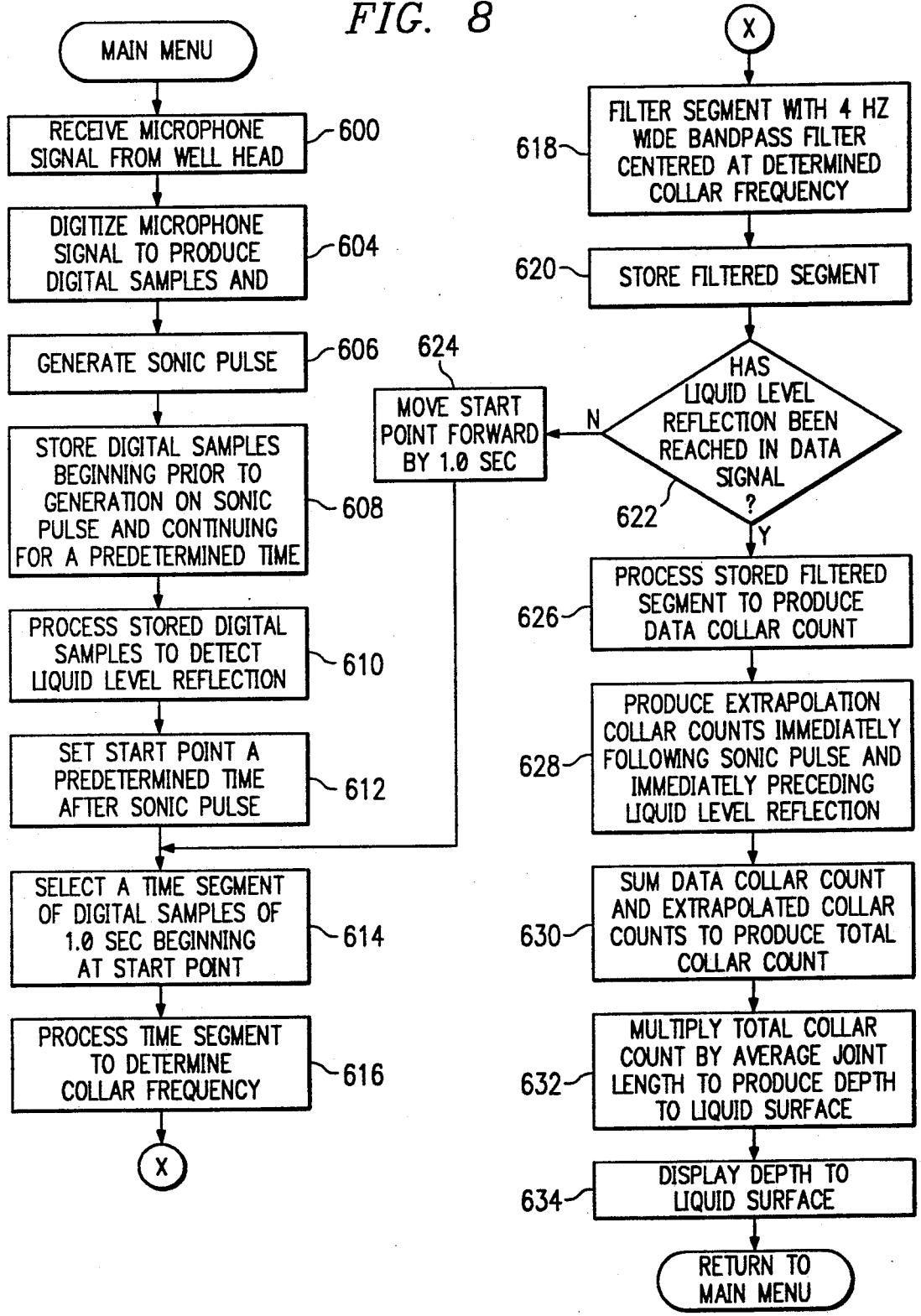
FIG. 8 is a flow diagram illustrating the processing of sequential segments of the data signal to extract the collar echo frequency and narrow band filtering of each segment with a band pass filter centered at the collar frequency.

A further embodiment for the signal collection and processing operations of the present system is described in reference to FIG. 8. Beginning with the main menu, entry is made to an operational block 600 in which the signal from microphone 152 is received from the wellhead. This is transferred through the electronics module 100 as described in reference to FIGS. 1 and 2. Continuing to operational block 604, the received microphone signal is digitized and the digital samples are stored in the computer 110. Upon initiation by an operator or by the computer 110, a sonic pulse is generated as indicated in block 606. This is done by direct action of the operator at the gun 86 or through an electrical signal generated by the computer 110 and transmitted through the solenoid driver 140 to the solenoid within the gun 86.

Following generation of the sonic pulse, the digital samples are stored for a time period beginning just prior to the generation of the sonic pulse and continuing for a predetermined time. The predetermined time must be sufficient to collect all of the return echoes from the lowest point in the well, namely from the surface 80 of the liquid. Next, in an operational block 610, the stored digital samples are processed to detect the reflection from the surface 80 of the liquid. This processing operation is further described below, particularly in reference to FIGS. 10A-E.

After the liquid level reflection has been detected and the time of occurrence for the liquid level reflection determined, a start point is set at a predetermined time following the sonic pulse. This is carried out in operational block 612. Next, in operational block 614, a time segment of the digital samples is selected having a duration of 1.0 seconds beginning at the start point. Following block 614, entry is made to an operational block 616 in which the digital samples in the selected time segment are processed to determine the collar frequency. This processing can be any of the techniques described herein including spectrum analysis as described in reference to FIGS. 13A and 13B, correlation as described in reference to FIG. 12A and cycle counting as described in reference to FIGS. 6, 7 and 11.

After the collar frequency has been determined in block 616, entry is made to an operational block 618 in which the data segment is filtered with a narrow band filter centered at the collar frequency and having a bandwidth of preferably 4 Hz, or within a range of 3-6 Hz. The resulting filtered data segment is then stored as set forth in operational block 620.

Following block 620, entry is made to a question block 622 in which an inquiry is made to determine if the liquid level reflection has been reached in the data signal. If not, the no exit is taken to an operational block 624 in which the starting point is moved forward by 1.0 seconds. Following block 624, entry is again made to operational block 614 to repeat the sequence of operations through block 614, 616, 618, 620 and 622. When the liquid surface reflection has been reached in the data signal, as indicated in question block 622, the yes exit is taken to an operational block 626 in which the stored filtered data segments are processed to produce a data collar count. This is done in accordance with the technique described herein in reference to FIGS. 6, 7 and 11. The result of the operations in block 626 produces a count of collars within the data signal.

Following block 626, entry is made to an operational block 628 in which extrapolation is carried out immediately following the sonic pulse and immediately preceding the liquid level reflection. The extrapolation is based upon the collar frequency determined for the adjacent segments to the sonic pulse in the liquid level reflection. This operation produces extrapolated collar counts for the beginning and end of the data signal.

Following block 628, entry is made to an operational block 630 in which the data collar count and extrapolated collar counts are summed to produce a total collar count. This total collar count is then multiplied in operational block 632 by the average joint length to produce a depth to the liquid surface 80. Following block 632, entry is made to an operational block 634 in which the depth to the liquid surface is displayed at the screen of the computer 110. Exit from the block 634 leads to a return to the main menu.

A further aspect of the present system is the measurement of acoustic velocity within a borehole in the earth. The processes described in reference to FIGS. 5A, 6 and 7 select a data segment from within the echo return data signal and process it to determine the rate of receipt of collar reflections, which is referred to as the collar frequency. The original data is then filtered with a bandpass filter centered at the collar frequency and having a relatively narrow bandwidth. In measuring acoustic velocity, the steps through this point are carried out but a different set of steps are subsequently performed for the measurement of acoustic velocity. Referring to FIG. 17, there is shown a signal 294 which has been narrow band filtered as described above. Note that there are markers for each cycle of the waveform. In measuring acoustic velocity, a pair of common points of the filtered digital data signal are selected which indicate an integer number of tubing joints. For example, markers 296 and 330, shown in FIG. 17, could be selected as the common points on the filtered digital data signal. These correspond to the reflections from ten tubing joints. The time between these two markers can be determined by substraction. The corresponding acoustic wave travel distance between the markers 296 and 330 is the product of ten times the average joint length multiplied by two. Acoustic velocity is then determined by dividing this total length by the previously determined travel time between these two marked points. For example, if the time differential is 0.5 seconds and the average joint length is 31 feet, then the total round trip travel distance is 620 feet. Dividing the travel distance by the travel time produces an acoustic velocity of 1240 feet per second. Such an acoustic velocity measurement can be made at any point in the data signal and likewise, can be made between any pair of common points, even for only one cycle representing one tubing joint. However, it is likely that more accurate measurements are made when a greater number of joints are included in the calculation.

Figure 10A:
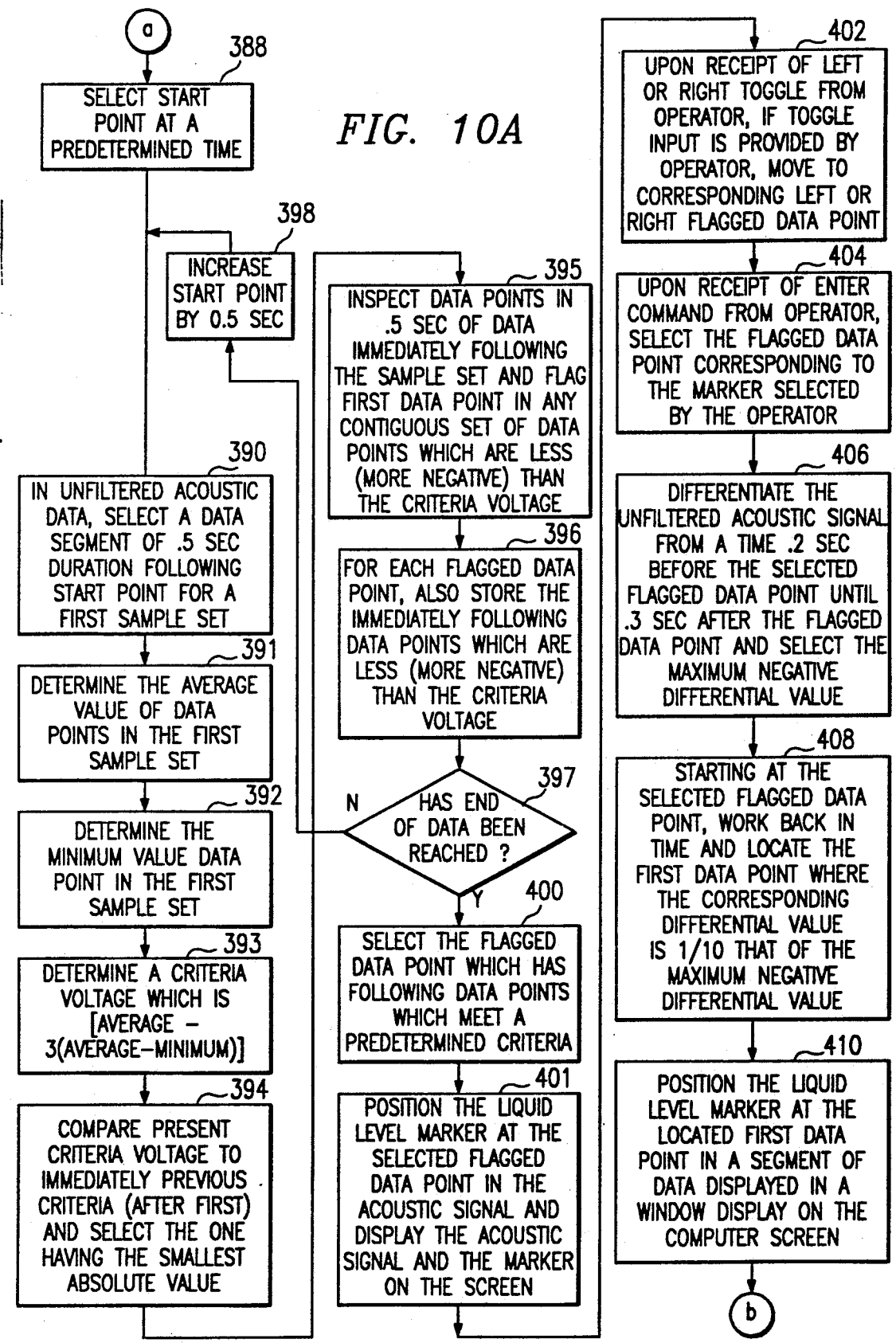
FIG. 10A is a flow diagram illustrating a process for determining the time of occurrence for the liquid surface reflection pulse in the acoustic echo signal, and posting a marker representing the determined time of occurrence.
Figure 10B:
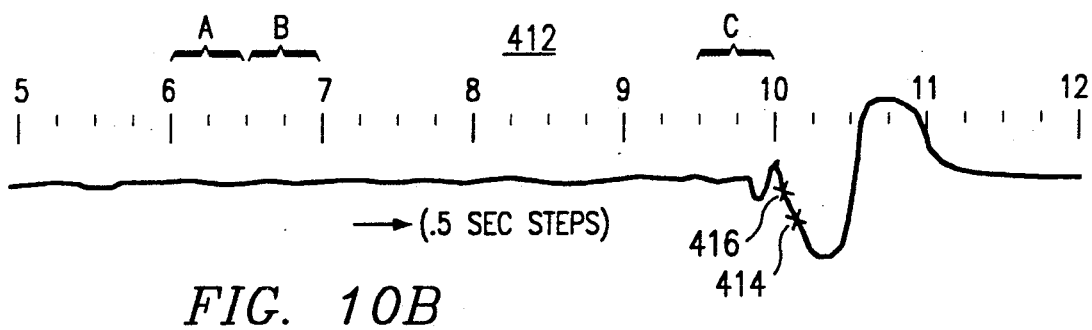
FIG. 10B is a waveform which illustrates the process described in reference to FIG. 10A, FIGS. 10C, 10D and 10E are waveforms which illustrate three techniques for liquid level echo pulse detection.

A detailed flow diagram is presented in FIG. 10A for a method of determining the time of occurrence for the liquid level reflection within the acoustic return signal. This is the operation carried out in block 222 shown between the points a and b in FIG. 5A. A waveform is illustrated in FIG. 10B which shows the application of the technique described in FIG. 10A to an acoustic waveform for detecting the time of occurrence of a liquid level reflection. Referring to FIG. 10A, following point a, entry is made to an operational block 388 in which a start point is selected at a predetermined point in time following the start of the data, that is, after the acoustic pulse. Generally, the start point is at the beginning of the return signal data.

For example, following block 388, entry is made into an operational block 390 in which a segment of the unfiltered acoustic data having a duration of 0.5 seconds is selected following the start point and this segment is designated as a first sample set. This is represented as the sample A in FIG. 10B, which begins at the start time of 6.0 seconds into the data signal. Following block 390, the system transfers to an operational block 391 in which the average value of the data points is determined in the first sample set. This average value is stored.

Following block 391, entry is made to an operational block 392 wherein the minimum data point is determined in the first sample set. This minimum data point is stored. The minimum value is defined as the smallest number from a positive data set, or the most negative number in a data set including any negative number.

Following block 392, entry is made into an operational block 393 in which a criteria voltage is calculated. This criteria voltage is the average value minus three times the quantity which is the average value minus the minimum value. Or, in other words, the criteria voltage is three times the algebraic minimum value minus two times the algebraic average value. The minimum value and average value for the first sample set were determined above in the preceding operational blocks 391 and 392. This criteria value is then stored for later use.

Following calculation of a criteria voltage, which is a signal amplitude, control is transferred to an operational block 394 in which the present criteria voltage is compared to the previously calculated criteria voltage or voltages and the one is selected which has the smaller absolute amplitude. This selection cannot occur until after a first criteria voltage has been determined. Thus, a criteria voltage is rejected if it has an absolute amplitude greater than any previously produced criteria voltage from earlier in the return signal.

Following the operational block 394, entry is made to an operational block 395. Block 395 defines a second set of data points covering a time period of 0.5 seconds. This corresponds to the data segment illustrated by the letter B in FIG. 10B. The data points for inspection start at a time which begins immediately following the end of the first sample set. The data samples in data segment B are inspected to determine if any of them are more negative than the criteria voltage Which was calculated in operational block 393. The first data point, within a contiguous group of such data points, that is less than this value is flagged.

From block 395, operation is transferred into an operational block 396. Within operational block 396, following each flagged data point, there is stored the immediately following data points each of which is less than the criteria voltage. No new data point is flagged until a data point is encountered which is greater (more positive) than the criteria voltage.

Following block 396, control is transferred to a question block 397. Within block 397, an inquiry is made to determine if the end of the acoustic data has been reached. If the end of data has not been reached, the no exit is taken to an operational block 398. Within the block 398, the time for the start point is increased by 0.5 seconds, thus moving the test for the A and B data segments, as shown in FIG. 10B, forward in time by 0.5 seconds. This above-described process is repeated in 0.5 second steps until the entirety of the data has been analyzed to detect a liquid level reflection and all of the flagged data points have been stored. Following the operational block 398, entry is made back into the block 390 to carry out the operations described in that block and the succeeding blocks. The loop through blocks 390-398 is continued until the end of the data is reached. There may be any number of flagged data points determined during this evaluation.

When the end of data has been reached, as determined in the question block 397, entry is made through the YES exit to an operational block 400. Within the block 400, a flagged data point is selected which has a predetermined characteristic for the immediately following data points which are less than the criteria voltage.

Figure 10C:
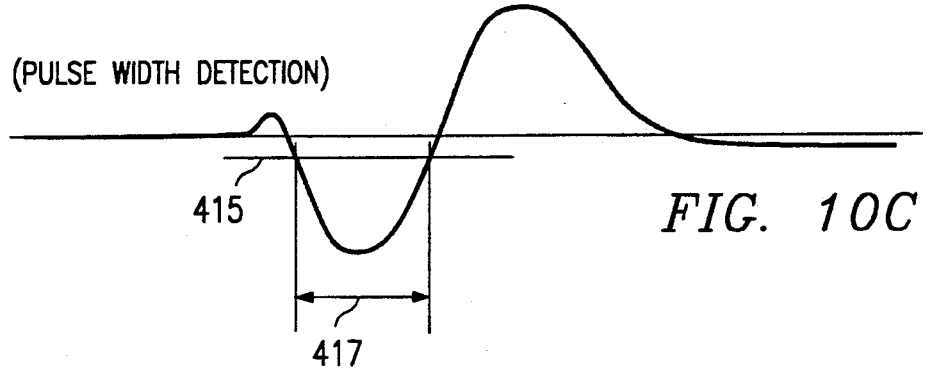
FIG. 10F is a flow diagram which illustrates a further signal processing technique for detection of a liquid surface reflection.
Figure 10D:
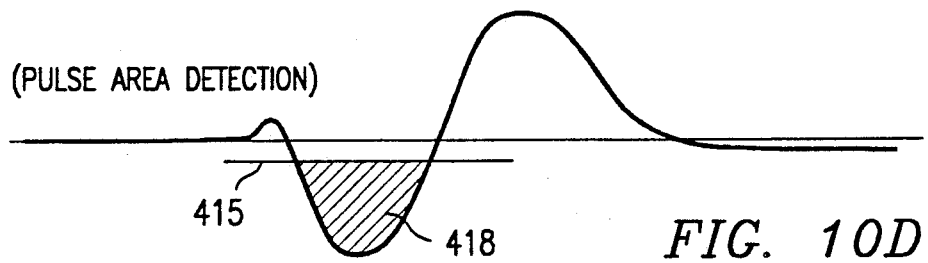
Figure 10E:
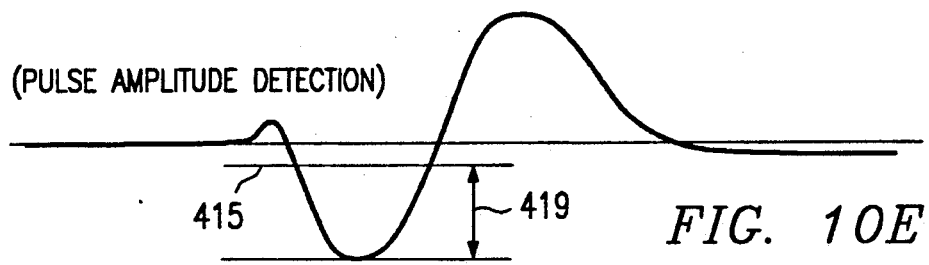

Three predetermined characteristics, any one of which can be used in block 400, are shown in FIGS. 10C, 10D and 10E. As shown in FIG. 10C, the first predetermined characteristic is pulse width detection. In many instances, the liquid level reflection is wider than pulses from other reflectors located within the casing annulus. The criteria voltage is shown as line 415. The immediate following signal data points make up the signal curve. All of the points below the line 417 exceed (are more negative than) the criteria voltage. The time period between the flagged sample, the first sample which exceeds the criteria voltage, and the last data sample in the group that exceed the criteria voltage is shown by the line 417. In block 400, this time period is measured for each of the flagged samples and the sample with the greatest corresponding time is designated as being the liquid level reflection. This is pulse width detection.

The second possible predetermined characteristic is shown in FIG. 10D. This is a selection based on the area of the pulse, and is currently the preferred selection characteristic. The pulse comprises the samples which exceed the criteria voltage represented by line 415. An area 418 is measured for the pulse. This can be done by subtracting the criteria voltage from each sample. Each difference is multiplied by the time between samples to produce an incremental area. The incremental areas are summed to produce the area 418. This is an integration process. The flagged data point having the greatest area is selected to be the liquid level reflection pulse.

A third possible predetermined criteria for block 400 is shown in FIG. 10E. This is a pulse amplitude detection. Again, a set of data samples are collected which follow the flagged sample and exceed the criteria voltage. This set is examined to select the sample having the greatest amplitude. This is indicated by line 419. All of the flagged samples are evaluated in this manner and the flagged sample having the greatest absolute amplitude pulse, as indicated by line 419 is selected as the liquid level reflection.

Following block 400, entry is made to an operational block 401 in which a liquid level marker is positioned along a display of the acoustic data at the point in the signal corresponding to the flagged data point having the following data points which meet the predetermined criteria. This display is produced on a computer screen in a format such as shown in FIGS. 15 and 16 with the marker 228. With the signal and the marker for the liquid level displayed on the computer screen, operation is transferred to an operational block 402. Within this block, the operator is free to toggle the keyboard 116 with keys, such as the left and right arrow keys, to move the liquid level marker to the left or right and position the marker at any of the other flagged data points. It is possible that the operator can determine that the automatically selected liquid level time is in error, so that a proper flagged data point can be selected. In addition, the operator may arbitrarily select a particular reflector, knowing that it is not the liquid level, but doing so in order to calculate the depth to that particular reflector. However, in most cases, the operator is attempting to determine the true liquid level reflection. The operator may also select any desired data point for measuring the depth to that point, as if it were the liquid level point.

Following the operational block 402, entry is made into the operational block 404. Within this block, the operator inputs an enter command to select the flagged data point corresponding to the marker which has been selected by the operator. This may be either the automatically determined marker point, or any other point which the operator has selected. The marker 228 is moved to the flagged data point selected by the operator.

Following block 404, the system transfers to operational block 406 wherein a process of differentiation is carried out for the original acoustic signal from a time 0.2 seconds before the selected flagged data point to a time 0.3 seconds after the flagged data point. The values of differentiation are determined over this interval. A selection is determined for the maximum negative differential value. Control is then transferred to operational block 408. Starting at the selected flagged data point, working backward in time, a location is made for the first data point encountered where the differential value is 1/10th that of the just determined maximum negative differential value. Referring to FIG. 10B, there are flagged data points corresponding to data segment C. For this example, it is assumed that the operator selected a flagged data point 414. The differentiation operation moves backwards to select a data point 416 where the differential is approximately 1/10th of the maximum differential.

Following the operational block 408, control is transferred to an operational block 410 wherein the liquid level marker is positioned at the first data point in the segment of data wherein the first data point corresponds to the point which has 1/10th the differential of the maximum negative differential. This is the point 416 shown in FIG. 10B. The segment of data which includes this data point, having a duration of approximately 0.5 seconds, is displayed in a separate window together with the liquid level marker as a vertical dashed line. This is shown in FIG. 16 as display 240.

Following the operational block 410, control is returned to operational block 224 in FIG. 5A.

As described above, the operator has the option of transmitting either a compression or rarefaction pulse down the borehole. The above description is for transmission of a compression pulse. If a rarefaction pulse is produced, the signal processing is just as described provided that the polarity of the received data is inverted for the processing. The computer 110 can receive an input at the keyboard thereof to indicate that a rarefaction pulse has been used and this input will cause the inversion of the polarity of the data.

Figure 10F:
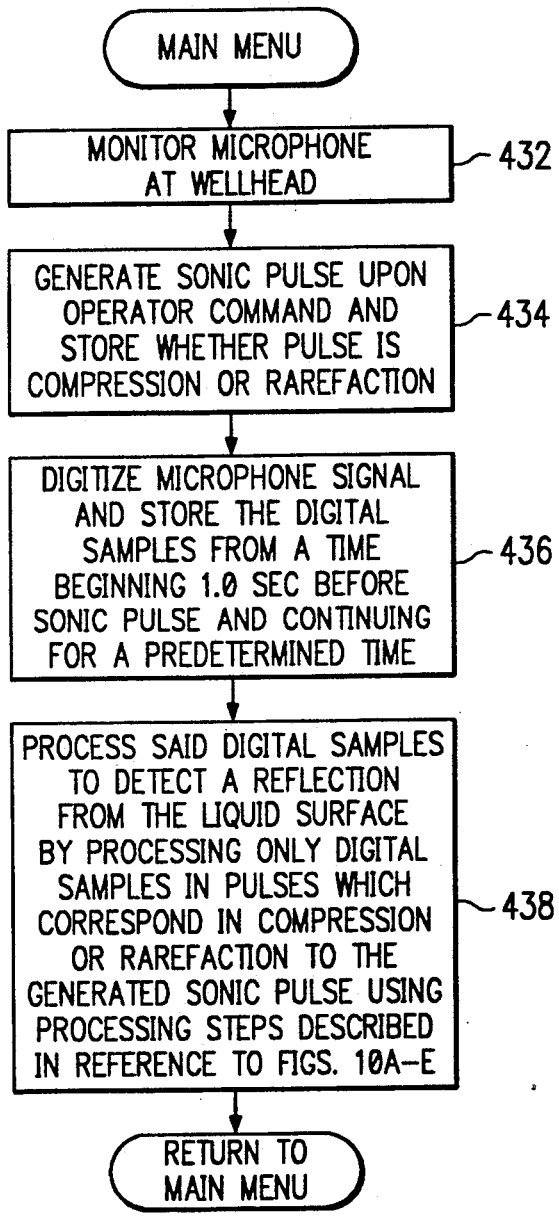

A variation of the process for detecting a liquid surface reflection as described above in reference to FIGS. 10A-E is illustrated in FIG. 10F. The generated sonic pulse can be either compression or rarefaction, as selected by the operator. This is referred to as the polarity of the acoustic pulse. Any obstruction in the borehole produces a pulse having the same polarity as the generated sonic pulse, however, any widening in the borehole produces an echo pulse which has the opposite polarity. The liquid surface is an obstruction. Therefore, the return from the liquid surface will always be the same polarity as that of the generated sonic pulse. This limitation can be utilized in signal processing to eliminate the wrong polarity pulses from consideration for being the liquid surface reflection. This reduction in possible pulses which could be the liquid level reflection increases the probability of finding the correct reflection pulse from the liquid surface. The flow diagram illustrated in FIG. 10F implements this feature into the liquid surface detection process described in reference to FIGS. 10A-E.

When a rarefaction pulse is used, the polarity of each digital sample is inverted and then stored. When this occurs the displayed data is the same as for a compression pulse. The same processing can then be used for detecting the liquid surface reflection and for counting collars.

Referring to FIG. 10F, following the main menu, entry is made to an operational block 432 in which the output of the microphone 152 is monitored by the electronics module 100. In operational block 434, a sonic pulse is produced which selectively is either compression or rarefaction, the selection of which is stored. As shown in operational block 436, the output of the microphone 152 is digitized and stored from a time 1.0 second before the generation of the sonic pulse and continuing for a predetermined time to collect echoes from the deepest portions of the well. Following operational block 436, entry is made to an operational block 438 in which the collected and stored digital samples are processed to detect the occurrence of the liquid surface reflection. In contrast to that described above, the processing of the digital samples is limited to the samples which are in pulses having the same polarity as that of the generated pulse. This reduces the number of samples which are examined and increases the likelihood that the true liquid surface reflection will be found. Otherwise, the processing of the digital samples is the same as that described in reference to FIGS. 10A-E above.

If a rarefaction pulse is used and the data is not polarity inverted, the liquid level detection processing must be logically inverted for processing this data. The system must be set to know the type of acoustic pulse by either operator input or sensing the generation of either a compression or rarefaction pulse.

The above description for detection of a liquid surface reflection uses a compression pulse acoustic event. If the initial pulse is compression, downhole restrictions produce compression reflections and downhole enlargements produce rarefaction pulses. If the initial pulse is rarefaction, downhole restrictions produce rarefaction pulses and downhole enlargements produce compression reflections. Therefore, for compression pulses the liquid surface reflection is compression. If the initial pulse is rarefaction, the liquid surface reflection is a rarefaction pulse.

If the liquid surface detection technique uses the polarity of the return acoustic pulse, it must know the polarity of the initial acoustic pulse.

The method described in FIGS. 6 and 7 for determining the interval T comprises detecting the most negative point of the waveform. Before such processing is initiated, the waveform, as noted above, is narrow band, pass band filtered. This removes any DC component so that the relative measurement of minimum points at each cycle can be done. In a similar manner, the maximum positive point could likewise be detected and the same processing operation carried out. A further detection process is the detection of zero crossovers in the signal. As noted, the DC component of the filtered signal is zero. This process is described in reference to FIG. 11. The process described in FIG. 11 for determining the collar reflection frequency can be substituted in place of the operational blocks 257 through 272 in FIG. 6 as well as the functions carried out by operational blocks 308, 310, 312, 314 and 316 in FIG. 7.

The procedures described in reference to FIGS. 6 and 7 detects the most negative point in each cycle for measuring the interval of the fundamental frequency. The technique referred to in reference to FIG. 11 is based upon detecting a zero crossover point for each cycle. Referring to FIG. 11, the first operational block 420 selects a first zero crossover point following the start point, previously defined, in the narrow band data. After the first zero crossover point is selected, the value of interval T is set to 30 ms. This is done in operational block 422. Next, an operational block 424 is entered in which ten samples are selected beginning at the starting point and spaced at T ms intervals. The sum of these samples is produced and the sum is stored together with the corresponding value of T. Following the operational block 424, entry is made to a question block 426. Within this block, an inquiry is made to determine if the value of T has reached 85 ms. If not, the negative exit is taken to an operational block 428 in which the value of T is increased by 1 ms. From the block 428, control is returned to the operational block 424 to again select 10 samples, sum the samples and store the sum of the samples together with the corresponding value of T.

When the value of T has reached 85 ms, as determined in question block 426, entry is made to an operational block 430 in which the minimum value of the sum of the samples is selected along with the corresponding value of T. This produces the best fit to the interval of the fundamental frequency within the narrow band data signal. Once this optimum interval has been selected, the remaining processing proceeds as described in the previous flow diagrams. The previous technique selected the absolute maximum value of the sums for picking the top or bottom points of each cycle while the method described in FIG. 11 picks the zero crossover point for each cycle.

A still further technique in accordance with the present system for counting the collar reflections is shown in FIGS. 12A and 12B. This is a process of correlation wherein a segment of the data signal, after it has been passband filtered in a range of approximately 11-30 Hz, is correlated with itself to produce the fundamental frequency present within the signal. The correlation process is graphically illustrated in FIG. 12B.

Referring to FIG. 12A, the first step is carried out in an operational block 440 wherein 1.0 second of data is selected following the start point, which has been designated previously by detecting the acoustic pulse in the data stream. Next, control is transferred to an operational block 442 wherein the data in the 1.0 second segment is correlated with itself to produce a correlation frequency which is the collar frequency. This is the rate of receipt of collar reflections within the data segment. The mathematical process of auto correlation is well known. It is graphically illustrated in FIG. 12B. In FIG. 12B, signal A represents the 1.0 second segment of data. The same signal segment is shown as signal B. The signal B is shifted from left to right as indicated by the arrow. It is moved at the interval of the sampling, which for example may be at 1.0 ms intervals. For each position of the signal B, there is point by point multiplication of the amplitudes of the corresponding points in signals A and B. If initially the two signals do not line up, the summation of the point by point multiplication is zero. As the signal B is moved toward the right, more and more points will line up in corresponding positions to produce predominantly positive products. Some of the multiplications of the corresponding points will produce negative results while others are positive. When these are summed, they will tend to cancel each other. However, when the two signals are lined up, all of the products will be positive and there will be a maximum summation product. This is illustrated for signal C shown in FIG. 12B. When the two signals line up, there will be a positive peak in the signal. If the signal B is repeated after the first peak and the process is extended, there will be another peak when it again lines up with the signal A. There will be a certain number of increments between these peaks, each increment corresponding to the movement of the signal B. The interval between the peaks is the value of T, the period of the principal signal component of the signal A. Thus, the correlation process produces the period for the fundamental signal within the sample signal segment. This is the reflections from the collars.

Further referring to FIG. 12A, there is stored the measured frequency, which corresponds to the inverse of the measured period T. This is performed in operational block 444.

Control is then transferred to a question block 446 in which an inquiry is made to determine if the end of the data, the valid data, has been reached. If not, a negative exit is taken to an operational block 448. Within the block 448, the next 1.0 second segment of data is selected. Control is then returned to the operational block 442 to again perform the correlation function upon the newly selected segment of data. In block 448, the newly measured frequency, corresponding to the measured interval T, is again stored. Note that any of these values may be a fractional or decimal value for a frequency.

When the response in question block 446 is positive, that is, the end of valid data has been reached, entry is made to an operational block 450 wherein any extrapolations are performed at the start of the data working backward to the acoustic pulse and working to the end of the data extending downward to the liquid reflection. This extrapolation is done to fill in missing components when valid data is not available. If valid data is available, but there is not a full 1.0 second worth of data, the shortened segment is used and the correlation process carried out.

Control is then transferred from block 450 to an operational block 452 wherein the sum of all the stored frequencies for all the data segments together with all the extrapolations, if any, is produced to get a total collar count. This count of collars can then be multiplied by the average joint length to produce a depth measurement from the surface to the liquid level within the well. The selection of a 1.0 second segment of data is arbitrary. Any length could be selected. If a duration of other than 1.0 sec is selected, each frequency measurement must be multiplied by the time duration before the summation is performed. However, a general guideline would be that if conditions within the well are uniform, a longer segment could be selected, but if pressure, density or temperature changes abruptly, it would be preferable to select smaller segments. Further, a good first approximation can be made simply by correlating a central portion of the signal as a single segment to produce an average value for the collar frequency within the data signal.

The correlation technique described above for producing collar counts can likewise be used to produce a collar frequency for defining the center frequency of a narrow band, band pass filter as described in reference to FIG. 6. The correlation process can be substituted for the described process of determining the interval T and the resulting collar frequency. The correlation process in this context can be done for either a selected segment of the return signal or can be used for a plurality of signal segments.

A further technique which can be used in accordance with the present system is to determine the collar frequency rate in the data signal by use of the process of spectrum analysis. This is described in reference to FIGS. 13A and 13B. Each of the processes described in either FIGS. 13A or 13B can be substituted in place of the operational blocks 257 through 272 in FIG. 6 as well as the functions carried out by operational blocks 308, 310, 312, 314 and 316 in FIG. 7.

Referring to FIG. 13A, a first operational block 500 selects approximately 1.0 seconds of data following a starting point, as noted above. Preferably, a number of samples is selected to have a number which is an integral power of 2, such as 1,024 samples. At a sampling rate of 1,000 samples per second, this would be 1.024 sec of data. Having such a number of samples, an integral power of 2, can enhance the speed and efficiency of spectrum analysis data processing. After the data has been selected, a process of spectrum analysis is carried out for the data in the 1.0 second segment to determine a frequency of collar reflection, which in almost all cases will be greater than 11 Hz.

Following operational block 502, an operational block 504 is entered to store the collar frequency. From block 504, entry is made to a question block 506 which determines if the end of data has been reached. If not, control is transferred to an operational block 508 which selects the next segment of data having a duration of 1.0 seconds. Control is then returned to operational block 502 to perform the operation of spectrum analysis and the sequential step of storing.

When the end of data has been reached, as noted in question block 506, control is transferred to an operational block 510. If any portion of the data signal is invalid, as determined in a comparison to the amplitude of the background noise as described above, extrapolation is carried out for the time periods between valid data and the time of occurrence of the initial pulse and the last valid data and the time of occurrence of the liquid level reflection. The initial time period is given at the rate of the first measured frequency and the final extrapolated time period is given the rate of the last measured spectrum analysis frequency. The time durations of each of these periods is measured as well.

Following operational block 510 control is transferred to an operational block 512 in which each collar frequency is multiplied by the time duration of its data segment and the product is stored as a collar count.

Following block 512, control is transferred to a block 514 in which the collar counts are summed together with the extrapolated collar counts to get a total collar count. This collar count is used in the same manner as described above to determine depth by multiplication by the average joint length.

A further technique in accordance with the present system is that shown in FIG. 13B. In an operational block 520, the entire data signal is spectrum analyzed to produce a fundamental frequency which is an average collar rate frequency. This is then stored. The duration of the signal, the travel time, is determined between the acoustic pulse and the liquid level reflection. In operational block 522, the collar frequency, determined by spectrum analysis, is multiplied by the travel time to produce a count of collars. This count is used in the same manner as described above to produce a depth by multiplication with the average joint length.

A further technique of the present system is a variation of that shown in FIG. 13B. Instead of spectrum analyzing the entire signal, a 1.0 second segment of data is selected at approximately the middle of the signal. This segment of data is spectrum analyzed to produce a fundamental frequency, which is the collar frequency. As shown in block 522, the collar frequency is multiplied by the travel time of the acoustic pulse to the liquid level reflection to produce a count of collars. This collar count is then used in the manner described above to produce a depth by multiplication with the average joint length. A selection of the segment of signal for analysis from the middle of the signal will likely result in the production of a collar frequency which is an average for the overall signal. However, signal segments at other portions of the signal could be selected if conditions were present to provide a uniform frequency, such as for a flowing gas in the well.

The process described in reference to FIG. 13A comprises an analysis of sequential segments of the data signal to produce a collar frequency for each segment. The frequency of each segment is then multiplied by the duration of the segment to produce a collar count. Finally, all of the collar counts are summed, with appropriate extrapolation at the beginning and ending of the data signal, to produce a summation collar count. The process of determining the collar frequency for each segment can be done by any one of multiple techniques described herein. Spectrum analysis is described in the description of FIG. 13A. However, other useful techniques are correlation as described in reference to FIG. 12A and counting cycles of a filtered data signal as described in reference to FIGS. 6, 7 and 11. When cycles are counted, the count for each segment is divided by the duration of the segment to get the frequency.

Figure 19A:
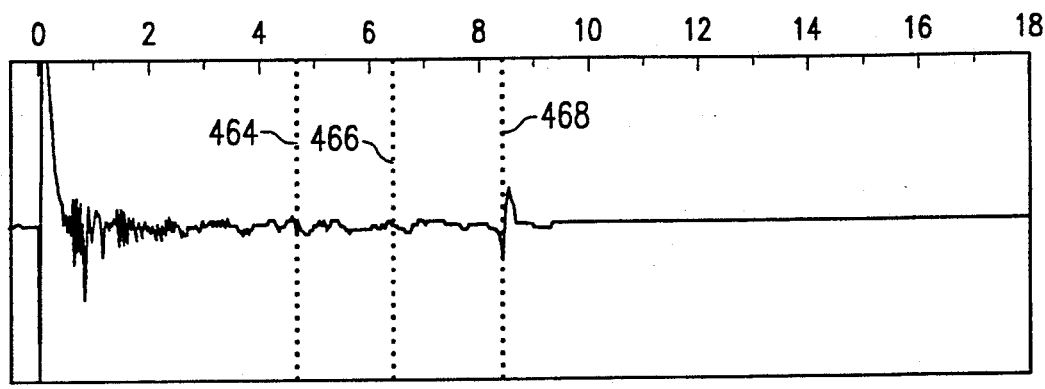
FIGS. 19A, 19B and 19C are a group of three signal traces which have indicators for detected possible liquid level reflections wherein nonmoving markers are eliminated from the last trace (FIG. 19C)
Figure 19B:
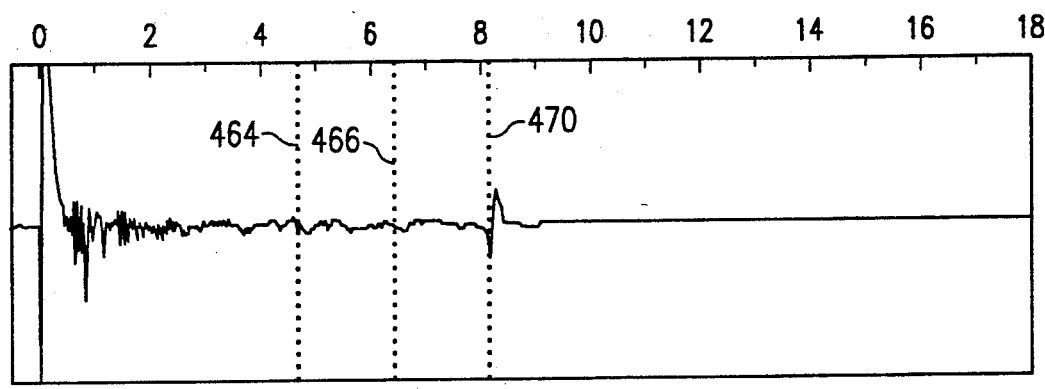
Figure 19C:
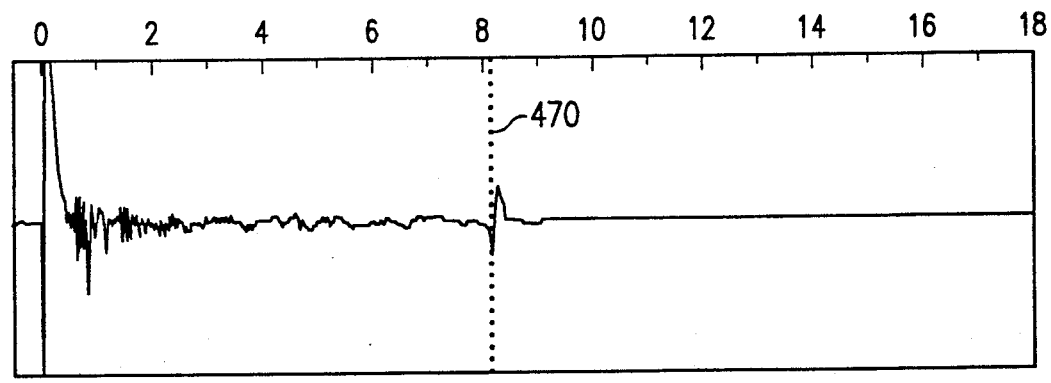

A further technique in accordance with the present system is described in reference to FIGS. 19A, 19B and 19C. As noted above, the return signal is processed to determine the time of occurrence for the liquid level reflection. However, in some instances, there may be a number of reflections in the return signal which meet the criteria for designation as the fluid surface reflection. In FIG. 19A, there is shown a return signal which has been processed to automatically detect the fluid level reflection pulse, but three possibilities have been found. These are shown by markers 464, 466 and 468. It is possible that an operator could determine the proper reflection by examining the original data signal, but this may not be the case in all instances. When such a determination cannot be made, the following procedure is carried out. After the shot is made to produce the signal in FIG. 19A, the production of fluid from the well is stopped by turning off the pumping unit which drives the pump 62, shown in FIG. 1. When the pump has been stopped, additional fluid 56 will continue to flow from the formation 50 and increase the height of the fluid column. (See FIG. 1) After a sufficient period of time has elapsed, such as 10-30 minutes, the operator conducts a further shot with the echo sounding equipment of the present invention and produces a signal which is shown in FIG. 19B. In FIG. 19B the markers 464 and 466 are repeated in virtually the same time locations because they represent reflections from fixed reflectors within the well. However, the previous marker 468 is no longer present, but a new marker 470 is shown. The operator then commands the system to determine which of the markers are different between the signals A and B. All markers that occur at the same time, or within a very narrow window of each other, such as 10 ms, are deleted. The result is a signal shown in FIG. 19C in which the markers at consistent times in the signals in FIGS. 19A and 19B have been deleted and the new marker representing the moved liquid level has been retained. This is marker 470. The signal waveform for the signal in FIG. 19C is the same as that shown for signal in FIG. 19B. The operator now has displayed the one marker which was not at the same time position in the signals shown in FIGS. 19A and 19B. Thus, this marker represents the reflection from the fluid surface.

A flow diagram for the process described in reference to FIGS. 19A-19C is shown in FIG. 20. From the main menu, entry is made to an operational block 550 in which an acoustic pulse is generated and data for a first data signal is collected for a pumping well. This is done as described above for collecting and digitizing a data signal.

Following operational block 550, control is transferred to an operational block 552. Within block 552, all data samples are flagged which meet the criteria for a liquid level reflection in the first data signal. This corresponds to any one of the three determined characteristics shown in FIGS. 10C-10E. This is further shown in FIG. 19A. The system will automatically select reflections and designate them with markers, such as marker 468 shown in FIG. 19A. However, the operator can move the marker to any other flagged sample, such as the markers 464 and 466.

Following the operational block 552, entry is made to an operational block 554. At this time the operator stops the pumping of the well for a period of time ranging from 10-30 minutes. During this time period, fluid flows from the formation into the well and raises the fluid column thereby decreasing the depth to the liquid level surface.

Following block 554, entry is made to operational block 556. Within this block, the operator enters a command to initiate an acoustic pulse and collect a second data signal for the well after the pumping has been shut down. This produces the data signal shown in FIG. 19B. Again, the system designates various pulses which may represent the fluid reflection. In this case, one of the markers is 470, but there are also shown markers 464 and 466 for the other designated samples. Note that the marker 470 is at a lesser time of occurrence than the marker 468. Since marker 468 disappeared and new marker 470 appeared after the shut down of the pumping of the well, it is very likely that these markers indicate a change in the depth of the liquid surface.

Operational block 560 is entered following block 558. In the second data signal, all flagged data samples are deleted which have corresponding flagged samples which occur within 10 ms of the time of occurrence of flagged samples in the first data signal. This process deletes the flagged data samples which are represented by the markers 464 and 466. The marker 470 has no corresponding marker within the window interval of 10 milliseconds for the first data signal shown in FIG. 19A.

Following block 560, control is transferred to an operational block 562. Within this block, the second data signal is displayed with markers for any remaining flagged sample or samples. In the present example, all of the flagged samples have been deleted other than the sample represented by marker 470.

Following block 562, entry is made to an operational block 564 in which the system receives an operator selection for the desired reflector. In this case, all of the possible reflectors, other than the one indicated by marker 470 had been deleted. The operator enters a command to select the desired reflector, in this case, it would be the reflector indicated by th marker 470. Entry is then made to operational block 566 in which the signal data is processed to determine the depth to the desired reflector location. This is the depth to the reflector indicated by the marker 470. This information is then displayed on the screen of the computer in the method described above.

Finally, following measurement of the depth to the desired reflector, operation is returned to the main menu.

A still further technique for determining movement of the liquid level, after having stopped pumping the well, is to display concurrently and in alignment the signals taken before and after the shut off of pumping. This comprising displaying on the computer screen, one on top of the other, the signal shown in FIGS. 19A and 19B. This are positioned in time alignment or correlation alignment. The operator can then easily see the common markers and the moved markers.

Figure 18:
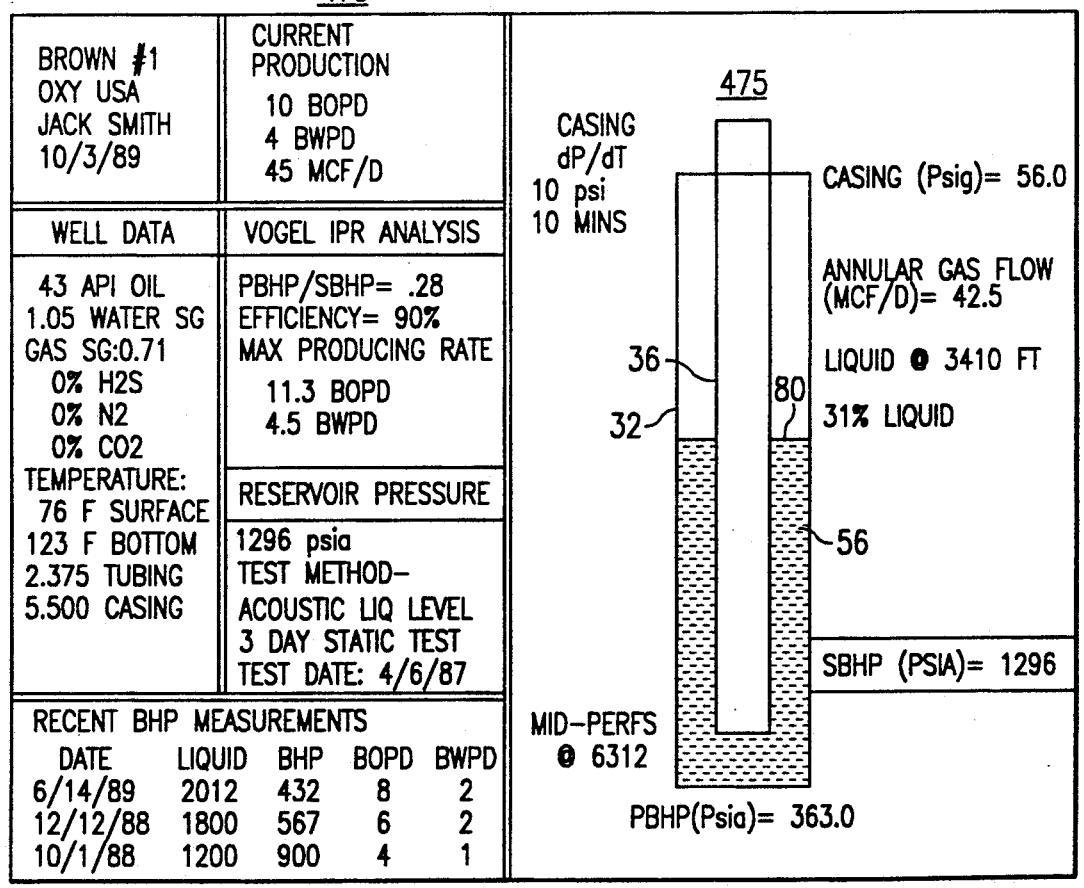
FIG. 18 is a screen display of production information for a well including bottom hole pressure, a graphical illustration of the lower segment of the well bore including liquid level depth, an inflow performance relationship together with other relevant parameter information including production efficiency and maximum production rates for this particular well, which were determined as a result of analysis of known information, information collected from the acoustic data, and casing pressure data.

Referring now to FIG. 18 there is illustrated a display 473 which includes a schematic illustration 475 for the lower portion of the borehole. As shown in illustration 475 there is the tubing string 36, casing 32, fluid 56 and column and a liquid surface 80. The display 473 includes a plurality of parameters describing a particular well. These include a complete description of the well including the date of completion. There is further included current production information including barrels of oil produced daily, barrels of water produced daily and thousands of cubic feet of gas produced daily. The well data further includes the API for the oil, water specific gravity, gas specific gravity, percentage of H2S, percentage of N2, and percentage of $CO_2$. Temperature information includes surface temperature, bottom temperature, tubing diameter and casing diameter. There is further included the average joint length.

A VOGEL IPR analysis, which is well known in the industry, includes a ratio of production bottom hole pressure and static bottom oil pressure, efficiency and maximum producing rate for barrels of oil per day and barrels of water per day. Reservoir pressure is further included in psia. A test measurement and date of test is further included for reservoir pressure. The display 473 further includes recent bottom hole pressure measurements for various times including the date, liquid depth, bottom hole pressure, barrels of oil per day (BOPD) and barrels of water per day (BWPD).

The schematic illustration 475 further includes a indication of rate of change of pressure, for example, 10 psi in ten minutes. Adjacent the schematic illustration 475 there is further provided the casing pressure in psig, annular gas flow in thousands of cubic feet per day, the depth to the liquid surface, the percentage of liquid in the fluid column for fluid 56, the static bottom oil pressure and the depth for the perforations. There is further included the production bottom hole pressure in pounds per square inch absolute. The illustration 475 is for a current measurement.

Each of the above parameters is either entered originally into the date for the system or calculated through the techniques described herein.

Figure 21:
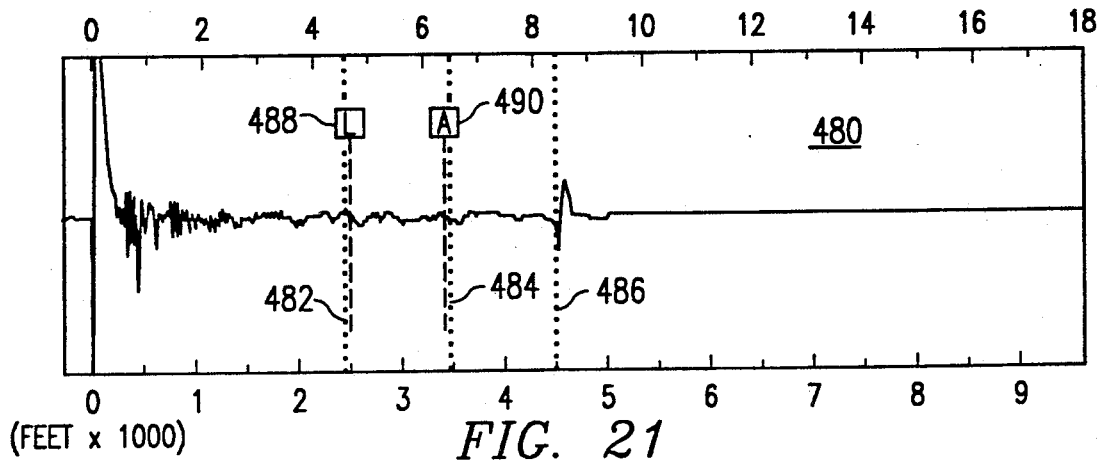
FIG. 21 is a display of a signal trace which includes markers for fixed reflectors together with a marker for an automatically detected liquid level reflection.

A still further aspect of the present invention is illustrated in FIG. 21. The depth of known, fixed reflectors in a particular well are stored in the data file for the particular well which is being analyzed. The display for this is shown in FIG. 14. Representative fixed reflectors in a well include tubing anchors, liners, upper perforations and any other discontinuity in the cross section of the well annulus has been made, as described above, the return signal is automatically processed to detect the liquid surface reflection using the techniques described. However, there may be multiple reflections which are tagged as liquid surface reflectors. Referring now to FIG. 21, there is shown a return signal 480 made by generating an acoustic shot in the manner described above. The signal 480 has been processed to detect liquid surface reflections and there have been produced three markers as a result of this processing. These are markers 482, 484 and 486. When multiple markers have been produced in this manner, the operator can recall from the data file for the particular well and mark on the display all of the known fixed reflectors. These are shown as the markers 488 and 490 in FIG. 21. Note that the designation markers 488 and 490 for fixed reflectors have a different format from those of the automatically calculated markers 482, 484 and 486. Marker 488 includes the one-letter symbol (L) which stands for liner. The marker 490 includes the letter symbol (A) which stands for tubing anchor. The fixed reflector markers 488 and 490 do not precisely line up with the reflection markers 482 and 484 because conditions within the well can vary. However, since they are so close, it can likely be assumed that these detected reflectors represent the known fixed reflectors within the well. The operator then knows that the reflector for marker 486 should be selected to be the fluid reflection. The system can then calculate the depth to the fluid reflector based upon the operator's selection of marker 486.

The process described in reference to FIG. 21 is shown as a detailed flow diagram in FIG. 22. Following the main menu, entry is made to an operational block 580 in which an acoustic pulse is generated and a data signal is produced for a selected well. Continuing to operational block 582, all data samples are flagged which meet the criteria for a liquid level reflection. This is the process described above in reference to FIG. 10A. Continuing to operational block 584, a display of the acoustic data waveform is produced at a display screen as a waveform with a marker for each of the flagged data samples. This is the waveform for signal 480 shown in FIG. 21. The markers for each of the flagged samples are 482, 484 and 486.

Following block 584, entry is made to an operational block 586. Within this block, there is retrieved a list of known reflectors and corresponding depths for the selected well. These reflectors are displayed as markers, each of which has a tagged reference corresponding to the type of reflector. These markers are placed at the corresponding depth (or time) for the selected reflector on the displayed waveform. As shown in FIG. 21, these are markers 488 and 490 which correspond to a liner (L) and a tubing anchor (A). Note that for the selected well the marker 488 lines up very close to the marker 482 and the marker 490 lines up very close to the marker 484. With this information displayed on the screen, the operator can reliably assume that the marker 482 is actually the reflection from the liner and the marker 484 is the reflection from the tubing anchor. Thus, the operator is safe to assume that the marker 486 represents the liquid surface reflection. He can then enter this selection and the system will calculate the depth to the liquid surface as indicated by the marker 486. The operator selection corresponds to the operations carried out in an operational block 588. The processing of this signal to determine the depth to the desired reflector is carried out in an operational block 590. This is done by use of the methods described above. After completion of the operations in block 590, the system returns to the main menu.

A further aspect of the present system is illustrated in FIG. 23. The aspect pertains to a technique for measuring the acoustic velocity of a generated pulse within the borehole of a well. Following the main menu, entry is made to an operational block 650 in which the microphone 152 at the wellhead is monitored. Next, in operational block 652, a sonic pulse is generated by the gun 86 either by direct operator control or through the computer 110 by means of the solenoid driver 140 which is connected to the solenoid within the gun 86.

Following generation of the sonic pulse, the signal from the microphone within the gun 86 is digitized by operation of the electronic components described in reference to the electronic module 100. The storage of the digitized samples begins 1.0 second before the generation of the sonic pulse and continues for a predetermined time period which is sufficiently long to collect all of the echo returns of interest. This produces a set of digital samples corresponding to the received signal. These digital samples are stored within the computer 110.

After the return signal has been digitized and stored, a time segment of the signal is selected as set forth in operational block 656. This time segment of digital samples is processed to extract a collar reflection frequency. This is done in operational block 658. A number of techniques have been described herein for extracting the collar reflection frequency within a set of digital signals. These include counting cycles of a filtered return signal as set forth in the descriptions referring to FIGS. 6, 7, and 11, correlation of the signal with itself to produce a fundamental frequency as described in reference to FIG. 12A and the process of spectrum analysis for a signal as described in reference to FIGS. 13A and 13B. Any one of these techniques can produce a collar reflection frequency by analyzing a segment of the digital samples.

Following operational block 658, entry is made to an operational block 660 in which the acoustic velocity is determined by multiplying the previously determined collar reflection frequency by the average joint length for the tubing joints within the well multiplied by two for round trip travel distance. This product is the acoustic velocity for the sonic pulse which was generated in operation of block 652 and transmitted down the borehole.

A still further aspect of the present system is a method for determining depth to the liquid surface 80 by use of spectrum analysis which can be performed very rapidly by the computer 110. This is described in reference to FIG. 24. From the main menu, entry is made to an operational block 680 in which the microphone signal at the wellhead is monitored for acoustic activity. Continuing to operational block 682, a sonic pulse is generated by either direct action of the operator or through a signal generated by the computer 110 and transmitted to the solenoid within the sonic gun 86. In an operational block 684, the microphone signal is digitized and stored to produce digital samples beginning at a time 1.0 second before the initiation of the sonic pulse and continuing for a predetermined time which is sufficiently long to collect all of the desired echo signals from the lowest region of the well.

After the echo signals have been collected as digital samples, they are processed in operational block 686 to detect the reflection from the liquid surface. This can be done by the techniques described in reference to FIGS. 10A-E This processing produces a time of occurrence for the liquid surface reflection.

In the next operational block 688, a subset of the digital samples is selected. The number of samples in this subset must be a power of 2. It is the largest number of such samples which can be taken from the totality of the digital samples which were collected between the initial pulse and the liquid reflection. The digitization rate for the equipment shown in FIGS. 1 and 2 is typically 1,000 samples per second. For a typical collection time of ten seconds, there will be produced 10,000 samples. The largest power of 2 which is less than 10,000 is 8,192. Therefore, the subset of the collect digital samples will have 8,192 samples. These are contiguous samples beginning at a predetermined time following generation of the sonic pulse, for example beginning at 0.2 seconds after generation of the sonic pulse. The selected subject of samples are then processed in operational block 690 by the operation of spectrum analysis to determine a fundamental frequency which is the average collar reflection frequency. It has been found that the operation of spectrum analysis can be conducted much faster when the sample set is an even power of 2. This substantially reduces the processing time for determining a collar frequency.

In operational block 694, the depth to the liquid surface from the wellhead is determined by taking the product of the collar frequency, travel time and average joint length. For example, if the collar frequency is 17 Hz, the travel time is 8.1 seconds and the average joint length is 31 feet, the depth to the liquid surface will therefore be approximately 4,270 feet.

In the next step, operational block 696, the determined depth is displayed to the operator for his use. Following block 696 return is made to the main menu.

A still further aspect of the present system is a method for determining depth to a liquid surface using a minimum amount of computer processing time. This is described in reference to FIG. 25. From the main menu, entry is made to an operational block 720 in which the return signal from the microphone is monitored at the wellhead. Following block 720, entry is made to an operational block 722 in which a sonic pulse is generated either directly by the operator at the sonic gun 86 or through a signal produced by the computer 110 and transmitted via electronic module 100 to the solenoid within the sonic gun 86. This produces a sonic pulse which is transmitted down the borehole to produce echoes from the collars of the tubing joints and any other discontinuities in the borehole, including the surface 80 of the fluid at the lower region of the borehole.

Continuing to an operational block 724, the signal from the microphone 152 within the gun 86 is digitized and the resulting digital samples are stored in the computer 110. The duration of the signal which is digitized and stored begins 1.0 second before the generation of the sonic pulse and continues for a predetermined time sufficient to collect all of the desired echoes.

Continuing to an operational block 726, the digital samples collected and stored are processed to detect the reflection from the liquid surface 80. This is described in detail in reference to FIGS. 10A-E. This produces a time of occurrence for the liquid surface reflection.

Following operational block 726, entry is made to an operational block 728 in which the travel time for the sonic pulse between the time of generation and the time of the reflection from the liquid surface is determined. Next, in an operational block 730, a time segment is selected from within the stored digital samples wherein the time segment is for any period of time, such as 1.0 second, between the generation of the sonic pulse and the time of occurrence for the liquid surface reflection. This time segment of digital samples is processed in operational block 732 to extract a collar frequency. This can be done by any one of the previously described techniques including the counting of cycles as described in reference to FIGS. 6, 7 and 11, correlation as described in reference to FIG. 12A and spectrum analysis as described in reference to FIGS. 13A and 13B. The result of the processing in block 732 is a collar frequency representing the rate of return of collar echoes in response to the generation of the sonic pulse.

The depth to the liquid surface is determined as shown in operational block 734. This depth is the product of the collar frequency, the travel time and the average joint length. The determined depth is then displayed, as set forth in operational block 736, to the operator. Following the display of the depth, the operation returns to the main menu for further operator selection and control. The process described in reference to FIG. 26 utilizes only a small segment of the overall stored digital samples to produce a depth of the liquid surface. Preferably the sample is selected at the midpoint of the data signal so that it is a more accurate average for the acoustic velocity throughout the borehole. As described above, this average will be even more accurate if there is a flow of gas from the well so that conditions are substantially uniform through the borehole.

However, if this request is difficult to analyze, much can can occur if a liner paraffin or other anomaly is present in this segment of data, another subset of data can be selected by the operator.

Figure 26:
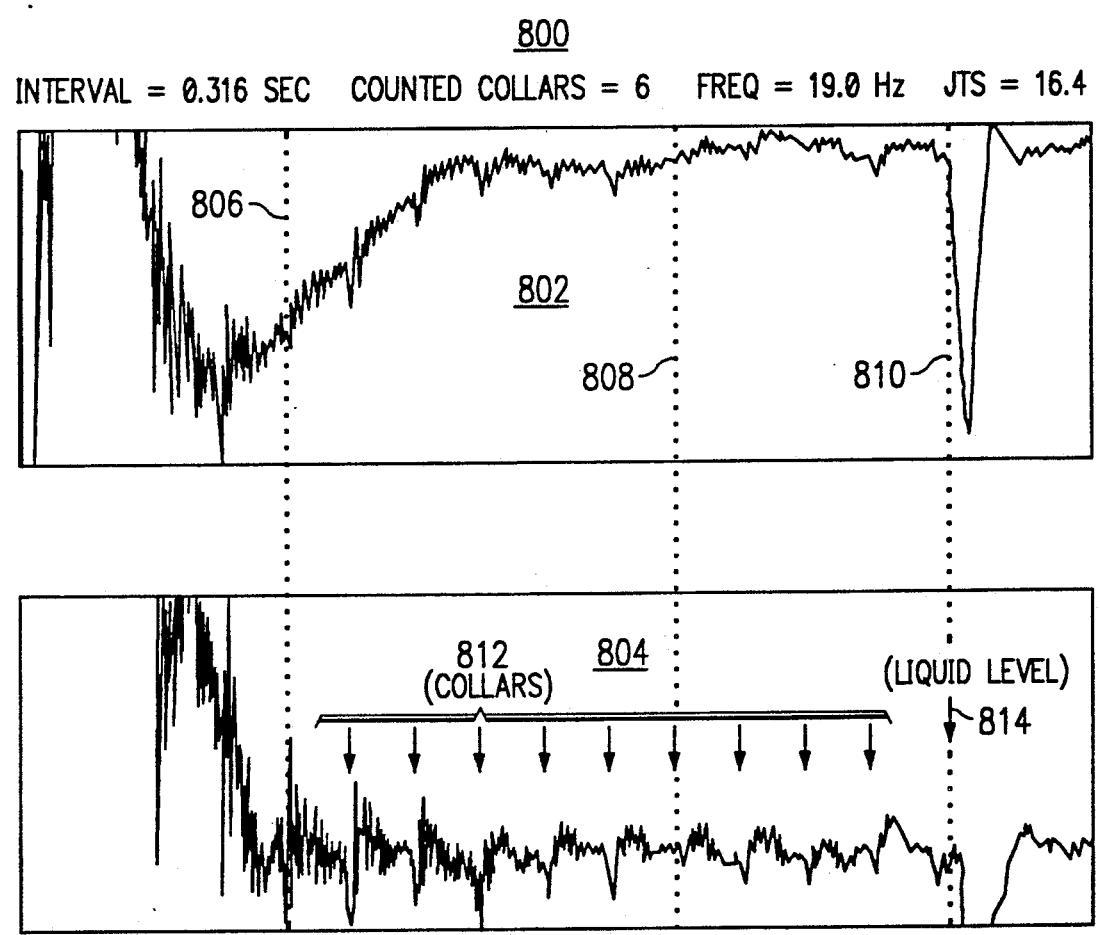
FIG. 26 is a screen display illustrating a waveform which shows collar reflections together with a filtered corresponding waveform which clearly indicates collar reflections and further includes markers positioned by an operator to indicate times of occurrence for collar reflections and defining a specific integral collar count between the markers.

A further aspect of the present invention is a method for measuring depth to a liquid surface that is particularly applicable to shallow wells, such as water wells. This method is described in reference to FIGS. 26 and 27. Referring to FIG. 26, there is shown a display 800 which includes waveforms 802 and 804. Each of these waveforms is a segment of a return signal produced in response to generating a sonic pulse and trasmitting the sonic pulse down a borehole. Echoes from collars and a liquid surface are shown in this segment of the return signal. For the display 800 there are included markers 806 and 808 which are positioned at peak points of the signal, which points represent collar reflections. There is further included a marker 810 which has been positioned at the time of occurrence for a liquid surface reflection. The determination of such a time of occurrence for a liquid surface reflection is described in detail above. The liquid level reflection is indicated by the reference numeral 814.

Various collar reflections are indicated by the numeral 812 and specifically by the short arrows indicating the occurrence points for collar reflections.

Figure 27:
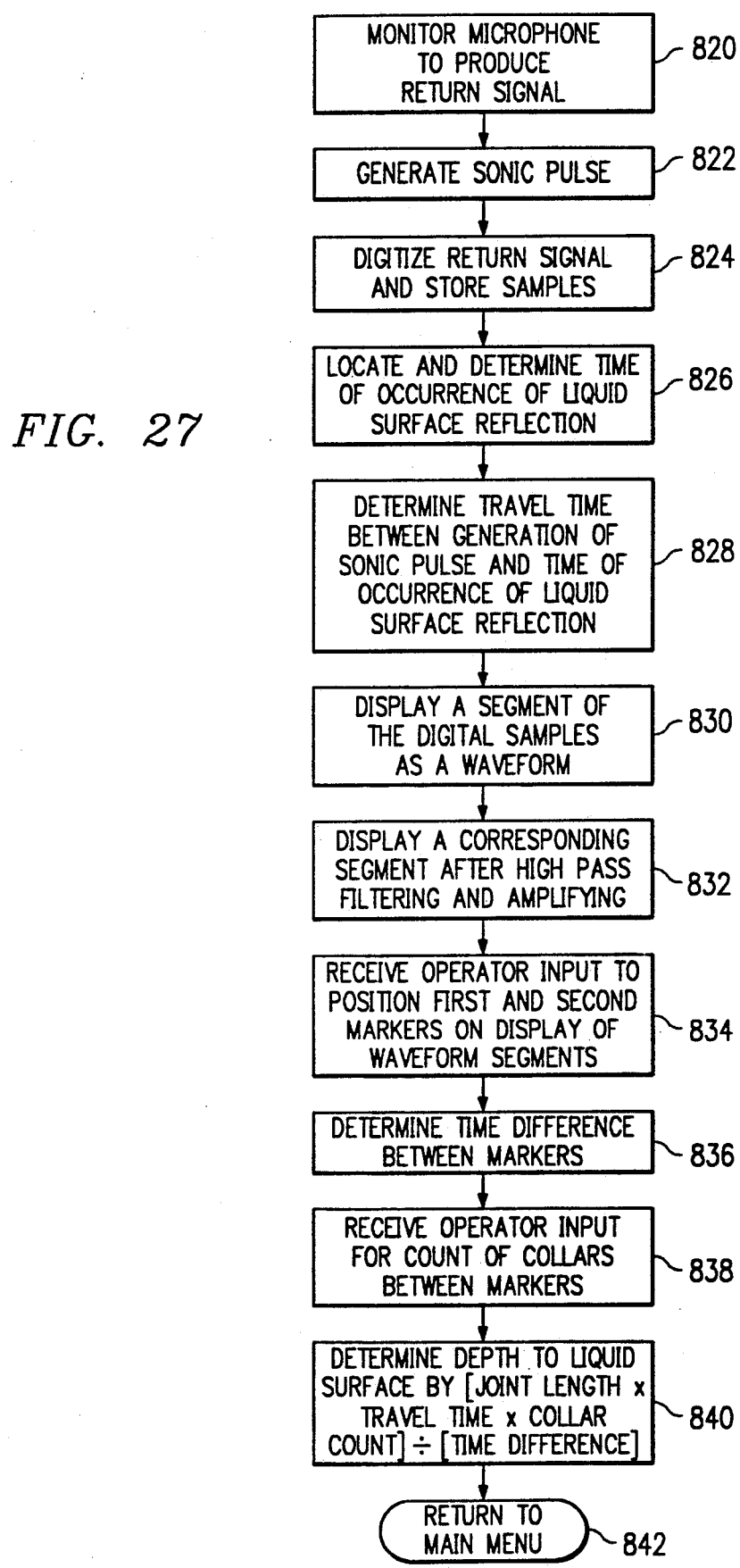
FIG. 27 is a detailed flow diagram illustrating a process for determining depth from a wellhead to a liquid surface by defining a time difference between occurrence of collar reflections and relating depth to the time difference, total travel time, joint length and a count of the number of collar reflections between the markers.

Referring now to FIG. 27, following entry at the begin block, system operation is begun in an operational block 820 in which a microphone is monitored to produce a return signal. Continuing to operational block 822, there is generated a sonic pulse, either compression or rarefaction as described above, which is transmitted down the borehole of a well.

Following operational block 822, control is transferred to an operational block 824 in which the return signal from the microphone is digitized and the resulting digital samples are stored. Next, in an operational block 826, the stored digital samples representing the return signal are processed as described above in detail, to determine the time of occurrence for the liquid surface reflection. This time of occurrence is stored and is indicated by the marker 810 in the display 800 in FIG. 26.

Following operational block 826, entry is made to an operational block 828 in which the travel time between generating the sonic pulse and the time of occurrence for the liquid surface reflection is determined. The procedure for carrying out this operation is also described above in detail. This produces a determined travel time between the earth's surface, the wellhead, and the liquid surface reflection. Next, a segment of the digitial samples is displayed as a waveform on the display 800. This is waveform 802 shown in FIG. 26. The corresponding segment of digital samples are also high pass filtered, for example a ten Hz high pass filter, and amplified to produce the waveform 812 which is shown in the lower portion on the display 800. The waveform 804 essentially has a low frequency component of the original signal removed together with some amplification of the signal to more clearly display the reflections from collars. These reflections are indicated by the arrows associated with the reference numeral 812.

Next, in reference to operational block 834, the system receives inputs from the operator to position the markers 806 and 808. The operator positions these markers at two offset points of occurrence for collar reflections. The markers are positioned as accurately as possible at the maximum signal point for each reflection. Following block 834, entry is made to an operational block 836 in which the time difference between the markers 806 and 808 is determined. For the illustrated examples, the time difference (interval) is 0.316 seconds. The markers 806 and 808 have been positioned to clearly define an integral number of collars. For the present example, there are 6 collar reflections between the markers 806 and 808. These can easily be seen and counted by the operator by reference to the display 800. Following block 836, entry is made to the operational block 838 in which the system receives an operator input for the count of collars between the markers. The operator can easily count that there are 6 collar reflections between the markers 806 and 808 and the number 6 is entered via the keyboard into the system. From this entry there is displayed the "counted collars" which in this example is "six".

There is further been stored in the data base for the particular well an average joint length for the tubing joints in the well. By use of the tubing joint information, number of counted collars and intervals, there is determined the collar frequency, which for the present example, is 19.0 Hz.

Following operational block 838, entry is made to an operational block 840 in which the depth to the liquid surface from the wellhead is determined. This depth is determined by multiplying the joint length by the travel time by the collar count and dividing the resulting product by the time difference between the markers 806 and 808. For the present example, the travel time from the wellhead to the liquid surface is 0.866 seconds. The average joint length is 31.6 feet. The product of 0.866 seconds and 6 and 31.6, all divided by 0.316 seconds produces a depth of approximately 518.1 feet. This depth is the resulting determined depth produced by operational block 540.

Following block 840, entry is made to an operational block 842 which returns to the main menu of the system.

Software for the present invention can be implemented with Quick Basic language by Microsoft Corporation, which language is well known in the industry, to perform the operations disclosed in reference to FIGS. 5A, 9, 10A, 10B, 10D, 10F, 14, 15, 16, 17, 18, 23 and 25.

Although several embodiments of the invention have been illustrated in the accompanying original drawings and described in the foregoing Detailed Description, it will be understood that the invention is not limited to the embodiments disclosed, but is capable of numerous rearrangements, modifications and substitutions without departing from the scope of the invention.

What we claim is:

1. A method for evaluating echo reflections produced in response to the transmission of acoustic energy down a borehole in the earth, the borehole having a tubing string therein comprising a plurality of interconnected tubing joints, comprising the steps of:
    detecting said reflections to produce a return signal,
    storing said return signal,
    displaying a waveform derived from said return signal on a screen, said waveform displayed along a dimension proportional to time,
    storing a listing of known depths for one or more fixed reflectors located in said borehole, and
    displaying a marker on said screen for each of said known reflectors in conjunction with said displayed waveform, each of said markers positioned along said dimension at a position corresponding to the depth in said borehole for the marker.

2. A method for acquiring and displaying data associated with a borehole in the earth which has an installed tubing string comprising interconnected tubing joints each having a collar, wherein acoustic energy is transmitted down the borehole for producing echo returns upon encountering discontinuities, including the tubing collars, in the borehole, the method comprising the steps of:
    monitoring said echo returns to produce a return signal,
    digitizing said return signal to produce a set of digital samples representing said return signal,
    storing said digital samples,
    displaying said digital samples on a display screen as a waveform corresponding to said return signal, and
    displaying incremental depth markers on said display screen in a line essentially parallel to said displayed waveform.

3. A method for acquiring and displaying data associated with a borehole in the earth which has an installed tubing string comprising interconnected tubing joints each having a collar, wherein acoustic energy is transmitted down the borehole for producing echo returns upon encountering discontinuities, including the tubing collars, in the borehole, the method comprising the steps of:
    monitoring said echo returns to produce a return signal,
    digitizing said return signal to produce a set of digital samples representing said return signal,
    storing said digital samples, and
    displaying said digital samples on a display screen as a waveform corresponding to said return signal.

4. A method for acquiring and displaying data associated with a borehole in the earth which has an installed tubing string comprising interconnected tubing joints each having a collar, wherein acoustic energy is transmitted down the borehole for producing echo returns upon encountering discontinuities, including the tubing collars and a liquid surface, in the borehole, the method comprising the steps of:
    monitoring said echo returns to produce a return signal,
    digitizing said return signal to produce a set of digital samples representing said return signal,
    storing said digital samples,
    displaying at least a portion of said digital samples on a display screen as a waveform corresponding to at least a portion of said return signal,
    displaying on said display screen concurrently with said waveform a marker which can be positioned on said waveform at any point thereof, and
    receiving an input from an operator, said input for moving the location of said marker along said waveform.

5. A method for acquiring and displaying data as recited in claim 4 including the step of filtering said digital samples prior to displaying said digital samples on said display screen.

6. A method for acquiring and displaying data associated with a borehole in the earth which has an installed tubing string comprising interconnected tubing joints each having a collar, wherein acoustic energy is transmitted down the borehole for producing echo returns upon encountering discontinuities, including the tubing collars and a liquid surface, in the borehole, the method comprising the steps of:
    monitoring said echo returns to produce a return signal,
    digitizing said return signal to produce a set of digital samples representing said return signal,
    storing said digital samples, displaying at least a portion of said digital samples on a display screen as a waveform corresponding to at least a portion of said return signal, processing said digital samples to detect therein an echo return from said liquid surface, displaying on said display screen concurrently with said waveform a marker positioned on said display to indicate essentially the point of occurrence in said return signal for said detected echo return from said liquid surface, and receiving an input from an operator after said marker has been positioned on said waveform, said input for moving the location of said marker along said waveform.

7. A method for determining depth and displaying data for a borehole in the earth which has an installed tubing string comprising interconnected tubing joints each having a collar, wherein sonic energy is transmitted down the borehole to produce echo returns upon encountering discontinuities, such as the tubing collars and a liquid surface, in the borehole, the method comprising the steps of:

monitoring said echo returns to produce a return signal, digitizing said return signal to produce a set of digital samples representing said return signal, storing said digital samples, displaying said digital samples on a display screen as a waveform corresponding to said return signal, wherein said displayed waveform extends along a dimension corresponding to either travel time for said sonic energy or to depth in said borehole, processing said digital samples to detect a reflection from said liquid surface, displaying on said display screen concurrently with said waveform a moveable marker which represents a depth location in said borehole, said marker initially positioned at a point on said display indicating said detected reflection from said liquid surface, receiving an input from an operator, said input for moving the location of said marker along said waveform, and processing said digital samples to calculate the depth in said borehole indicated by the position of said marker.

8. A method for acquiring and displaying data associated with a borehole in the earth which has an installed tubing string comprising interconnected tubing joints each having a collar, wherein acoustic energy is transmitted down the borehole for producing echo returns upon encountering discontinuities, including the tubing collars in the borehole, the method comprising the steps of:

monitoring said echo returns to produce a return signal, digitizing said return signal to produce a set of digital samples representing said return signal, storing said digital samples, processing said digital samples to accent said echo returns produced by said tubing collars, and displaying at least a portion of said processed digital samples on a display screen as a waveform.

9. A method for acquiring and displaying data associated with a borehole in the earth which has an installed tubing string comprising interconnected tubing joints each having a collar, wherein acoustic energy is transmitted down the borehole for producing echo returns upon encountering discontinuities, including the tubing collars in the borehole, the method comprising the steps of:

monitoring said echo returns to produce a return signal, digitizing said return signal to produce a set of digital samples representing said return signal, storing said digital samples, processing said digital samples to accent said echo returns produced by said tubing collars, displaying at least a portion of said processed digital samples on a display screen as a waveform, processing said digital samples to detect said echo returns produced by said tubing collars, and producing on said displaying waveform a respective marker indicating each of said tubing collars echoes.

10. A method for acquiring and displaying data associated with a borehole in the earth which has an installed tubing string comprising interconnected tubing joints each having a collar, wherein acoustic energy is transmitted down the borehole for producing echoes upon encountering discontinuities, including the tubing collars and a liquid surface, in the borehole, the method comprising the steps of:

generating sonic energy and transmitting said sonic energy down said borehole to produce echoes from reflectors in said borehole, monitoring said echoes to produce a return signal, digitizing said return signal to produce a set of digital samples representing said return signal, storing said digital samples, displaying at least a portion of said digital samples on a display screen as a waveform corresponding to at least a portion of said return signal, processing said digital samples to detect therein an echo return from said liquid surface, and displaying on said display screen concurrently with said waveform a marker positioned on said display screen to essentially point to the occurrence in said return signal of said detected echo return from said liquid surface.

11. A method for producing a display associated with detecting a liquid surface reflection in an echo return signal produced by transmitting sonic energy down a fluid production well having a borehole with an installed tubing string comprising interconnected tubing joints each having a collar, the method comprising the steps of:

generating said sonic energy and transmitting said sonic energy down said borehole to produce echoes from reflectors in said borehole, monitoring said echoes to produce a first return signal, digitizing said return signal to produce a first set of digital samples representing said return signal, storing said first set of digital samples, displaying at least a portion of said first set of digital samples on a display screen as a first waveform corresponding to at least a portion of said return signal, processing said first set of digital samples to detect therein a plurality of first echo return pulses, each of which could possibly be from said liquid surface, displaying on said display screen concurrently with said first waveform a plurality of markers positioned on said display screen to indicate essentially the points of occurrence in said first return signal of said detected first echo return pulses, stopping the production of liquid from said well, generating sonic energy and transmitting said energy down said borehole to produce echoes from reflectors in said borehole, monitoring said echoes to produce a second return signal, digitizing said second return signal to produce a second set of digital samples representing said second return signal, storing said second set of digital samples, displaying at least a portion of said second set of digital samples on a display screen as a second waveform corresponding to at least a portion of said second return signal, processing said second set of digital samples to detect therein a plurality of second echo return pulses, each of which could possibly be from said liquid surface, displaying on said display screen concurrently with said second waveform a plurality of markers positioned on said display screen to indicate essentially the points of occurrence in said second return signal of said second detected echo return pulses, and deleting from said second displayed waveform all markers which have a corresponding marker, within a predetermined time period in said first waveform, wherein a remaining marker displayed in conjunction with said second waveform corresponds to the echo return pulse from said liquid surface.

12. A method for displaying data associated with a borehole having an installed tubing string comprising interconnected tubing joints each having a collar wherein an acoustic event is transmitted down the borehole for producing echo returns upon encountering discontinuities, including the tubing collars and a liquid surface, the method comprising the steps of:

monitoring said echo returns to produce a return signal, digitizing said return signal to produce a set of digital samples representing said return signal, storing said digital samples representing said return signals, processing said stored digital samples to determine the depth to the liquid surface, and displaying a schematic illustration of at least a portion of the borehole and including the determined liquid surface depth displayed in conjunction with the schematic illustration.

13. A method for displaying data associated with the borehole as recited in claim 12 wherein the schematic illustration includes the bottom of the string of tubing joints, a casing in said borehole and a column of liquid which indicates said liquid surface.

14. A method for displaying data as recited in claim 12 further including a display of casing pressure.

15. A method for displaying data as recited in claim 12 further including a display of casing pressure buildup.

16. A method for displaying data as recited in claim 12 including a display of casing annulus gas flow rate.

17. A method for displaying data as recited in claim 12 including a display of the amount of liquid present in a gaseous liquid column.

18. A method for displaying data as recited in claim 12 including a display of one or more wellbore pressures including at least the bottom oil pressure.

19. A method of displaying data as recited in claim 12 including a display of static bottom oil pressure or reservoir pressure.

20. A method of displaying data as recited in claim 12 wherein the schematic illustration specifically includes elements for the tubing, tubing perforations and pump depth.

21. A method for displaying data as recited in claim 12 including a display for a list of borehole parameters.

22. A method for displaying data as recited in claim 12 further including a display of the ratio of the producing bottom oil pressure to the static bottom oil pressure.

23. A method for displaying data as recited in claim 12 further including a display indicating a fluid inflow perforamce relationship for the borehole.

24. A method for displaying data as recited in claim 12 further including a display for the maximum production capability for the borehole.

25. A method for displaying data as recited in claim 12 including a display of acoustic velocity within the gas in well bore.

26. A method for displaying data as recited in claim 12 including a display for the current production rate of the borehole.

27. A method for evaluating or displaying echo reflections produced in response to transmission of acoustic energy down a borehole which has a tubing string installed therein comprising a plurality of interconnected tubing joints each having a collar, a method comprising the steps of:

detecting said reflections to produce a return signal, digitizing said return signal to produce a set of digital samples representing said return signal, storing said digital samples, displaying said digital samples as a first waveform, processing said digital samples to enhance the reflections from said collars thereby producing a second set of digital samples, storing said second set of digital samples, and displaying at least a portion of said second set of digital samples as a waveform concurrently with the display of said first waveform.

* * * * *

UNITED STATES PATENT AND TRADEMARK OFFICE
CERTIFICATE OF CORRECTION

PATENT NO. : 5,117,399
DATED : May 26, 1992
INVENTOR(S) : McCoy, et al.

It is certified that error appears in the above-identified patent and that said Letters Patent is hereby corrected as shown below:

Col. 4, line 56, please delete the word "t" and substitute therefor the word -- to --.

Col. 6, line 39, immediately following the word "collars", please insert the punctuation symbol -- . --.

Col. 6, line 43, immediately following the word "objects", please insert the punctuation symbol -- . --.

Col. 6, line 57, immediately following the word "analyzed", please insert the punctuation symbol -- . --.

Col. 7, line 1, immediately following the word "variables", please insert the punctuation mark -- . --.

Col. 9, line 31, immediately following the numeral "176", please insert the punctuation mark -- . --.

Col. 16, line 52, please delete the word "b" and substitute therefor the word -- been --.

Col. 20, line 55, please delete the word "Which" and substitute therefor the word -- which --.

Correct the sentence fragmentation at Col 22, lines 32-33.

Col. 32, line 31, immediately following the letter "E", please insert the punctuation mark -- . --.

UNITED STATES PATENT AND TRADEMARK OFFICE
CERTIFICATE OF CORRECTION

PATENT NO. : 5,117,399
DATED : May 26, 1992
INVENTOR(S) : McCoy, et al.

It is certified that error appears in the above-identified patent and that said Letters Patent is hereby corrected as shown below:

Col. 32, line 48, please delete the word "subject" and substitute therefor the word -- subset --.

Col. 33, line 63, please delete the second occurrence of the word "can".

Col. 34, line 5, please delete the word "trasmitting" and substitute therefor the word -- transmitting --.

Col. 35, line 47, please delete the word "the".

Col. 38, line 15, please delete the word "displaying" and substitute therefor the word -- displayed --.

Col. 38, line 16, please delete the word "collars" and substitute therefor the word -- collar --.

Signed and Sealed this

Twelfth Day of October, 1993

Attest:

BRUCE LEHMAN

Attesting Officer

Commissioner of Patents and Trademarks